(12) United States Patent
No et al.

(10) Patent No.: US 10,180,592 B2
(45) Date of Patent: Jan. 15, 2019

(54) LIQUID CRYSTAL DISPLAY

(71) Applicant: Samsung Display Co., Ltd., Yongin (KR)

(72) Inventors: Sang Yong No, Seoul (KR); Myoung Sup Kim, Suwon-si (KR); Sung Hoon Kim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 81 days.

(21) Appl. No.: 14/742,946

(22) Filed: Jun. 18, 2015

(65) Prior Publication Data

US 2016/0178961 A1    Jun. 23, 2016

(30) Foreign Application Priority Data

Dec. 17, 2014  (KR) .......................... 10-2014-0182298

(51) Int. Cl.
*G02F 1/1335*   (2006.01)
*G02F 1/1362*   (2006.01)
*G02F 1/1343*   (2006.01)

(52) U.S. Cl.
CPC .... *G02F 1/133514* (2013.01); *G02F 1/13624* (2013.01); *G02F 1/133512* (2013.01); *G02F 1/134309* (2013.01); *G02F 1/136286* (2013.01); *G02F 2001/134345* (2013.01); *G02F 2201/40* (2013.01); *G02F 2201/52* (2013.01)

(58) Field of Classification Search
CPC ......... G02F 1/133512; G02F 1/133514; G02F 1/136286; G02F 1/134309
See application file for complete search history.

(56) References Cited

U.S. PATENT DOCUMENTS 6,365,916 B1 * 4/2002 Zhong ............... G02F 1/136213
                                                    257/59
6,707,067 B2    3/2004 Zhong et al.
(Continued)

FOREIGN PATENT DOCUMENTS

KR    1020090096227    9/2009
KR    1020130014290    2/2013
KR    1020130034168    4/2013

OTHER PUBLICATIONS

Extended European Search Report—European Patent Application No. 15177805.7 dated May 3, 2016, citing US2008-0136992 and US2014-0055698.

*Primary Examiner* — Dung Nguyen
(74) *Attorney, Agent, or Firm* — Cantor Colburn LLP

(57) ABSTRACT

A liquid crystal display ("LCD") includes a first color pixel area, a second color pixel area, and a first boundary area disposed between the first color pixel area and the second color pixel area is provided, the LCD including a first substrate and a second substrate facing each other, a first color filter disposed in the first color pixel area and the first boundary area on the first substrate, a second color filter disposed in the second color pixel area and the first boundary area on the first substrate, and a liquid crystal layer disposed between the first substrate and the second substrate, wherein a first overlapping portion where the first color filter overlaps the second color filter in the first boundary area is disposed closer to the second color pixel area than to the first color pixel area.

20 Claims, 23 Drawing Sheets

(56) References Cited

U.S. PATENT DOCUMENTS

| | | | |
|---|---|---|---|
| 7,394,510 B2* | 7/2008 | Oh | G02F 1/134336 |
| | | | 349/106 |
| 2004/0257500 A1 | 12/2004 | Kim et al. | |
| 2005/0270445 A1 | 12/2005 | Lee et al. | |
| 2008/0136992 A1 | 6/2008 | Kim | |
| 2011/0216276 A1* | 9/2011 | Yang | G02F 1/1335 |
| | | | 349/108 |
| 2014/0055698 A1 | 2/2014 | Kim et al. | |
| 2016/0004107 A1* | 1/2016 | Chiu | G02F 1/133784 |
| | | | 349/106 |

\* cited by examiner

FIG. 1

| PX(R) | b1 | PX(G) | b2 | PX(B) |

LIQUID CRYSTAL DISPLAY

This application claims priority to Korean Patent Application No. 10-2014-0182298 filed on Dec. 17, 2014, and all the benefits accruing therefrom under 35 U.S.C. § 119, the entire contents of which are incorporated herein by reference.

BACKGROUND (a) Field

The invention relates to a liquid crystal display ("LCD"). More particularly, the invention relates to an LCD for increasing a contrast ratio.

(b) Description of the Related Art

A liquid crystal display ("LCD"), which is one of flat panel displays most widely used at present, includes two display panels on which electric field generating electrodes such as a pixel electrode and a common electrode are formed, and a liquid crystal layer inserted therebetween. The LCD displays an image by generating an electric field on a liquid crystal layer by applying a voltage to the electric field generating electrodes, determining alignments of liquid crystal molecules of the liquid crystal layer through the generated electric field, and controlling polarization of incident light.

Recently, the LCDs have been becoming wider, and curved display devices are being developed to enhance immersion of viewers.

After performing the above-described initial alignment to manufacture the flat LCD, when the flat LCD is bent through a bending process to realize the curved LCD, a misalignment is generated between the two display panels, thereby causing a defect of the image, e.g., a texture defect.

To solve the problem, a configuration for omitting a light blocking member from a portion overlapping a data line has been proposed. That is, when the light blocking member overlaps the data line, the light blocking member blocks a light transmitting portion of the pixel when misaligned, thereby deterring the defect of the image.

SUMMARY

The invention has been made in an effort to provide a liquid crystal display ("LCD") for increasing a contrast ratio.

An exemplary embodiment of the invention provides an LCD including a first color pixel area, a second color pixel area, and a first boundary area disposed between the first color pixel area and the second color pixel area, including a first substrate and a second substrate facing each other, a first color filter disposed in the first color pixel area and the first boundary area on the first substrate, a second color filter disposed in the second color pixel area and the first boundary area on the first substrate, and a liquid crystal layer disposed between the first substrate and the second substrate, where a first overlapping portion where the first color filter overlaps the second color filter in the first boundary area is disposed closer to the second color pixel area than the first color pixel area.

In an exemplary embodiment, the first substrate and the second substrate may be bent.

In an exemplary embodiment, the first color filter may represent one of red and blue, and the second color filter may represent green.

In an exemplary embodiment, the LCD further includes a first color pixel electrode disposed in the first color pixel area on the first substrate, a first data line and a second data line connected to the first color pixel electrode, a second color pixel electrode disposed in the second color pixel area on the first substrate, and a third data line and a fourth data line connected to the second color pixel electrode, where the second data line is disposed closer to the first color pixel area than to the second color pixel area in the first boundary area, and the third data line is disposed closer to the second color pixel area than to the first color pixel area in the first boundary area.

In an exemplary embodiment, a first-side edge of the first overlapping portion may be disposed between the second data line and the third data line, and a second-side edge of the first overlapping portion may overlap the third data line.

In an exemplary embodiment, a first-side edge and a second-side edge of the first overlapping portion may overlap the third data line.

In an exemplary embodiment, a first-side edge of the first overlapping portion may overlap the second data line, and a second-side edge of the first overlapping portion may overlap the third data line.

In an exemplary embodiment, the LCD may further include a storage electrode disposed between the second data line and the third data line.

In an exemplary embodiment, a first-side edge of the first overlapping portion may overlap the storage electrode, and a second-side edge of the first overlapping portion may overlap the third data line.

In an exemplary embodiment, the LCD further may include a gate line connected to the first color pixel electrode, the second color pixel electrode, and the third color pixel electrode, and a light blocking member disposed on the second substrate, where the light blocking member overlaps the gate line and does not overlap the first to fourth data lines.

In an exemplary embodiment, the first color pixel electrode may include a first sub-pixel electrode and a second sub-pixel electrode, the first data line may be connected to the first sub-pixel electrode, and the second data line may be connected to the second sub-pixel electrode, while the second color pixel electrode includes a third sub-pixel electrode and a fourth sub-pixel electrode, the third data line is connected to the third sub-pixel electrode, and the fourth data line is connected to the fourth sub-pixel electrode.

In an exemplary embodiment, the LCD further may include a third color pixel area, and a second boundary area disposed between the second color pixel area and the third color pixel area, and a third color filter disposed in the third color pixel area and the second boundary area on the first substrate, where the second color filter is further disposed in the second boundary area, and a second overlapping portion where the second color filter overlaps the third color filter in the second boundary area is disposed closer to the second color pixel area than to the third color pixel area.

In an exemplary embodiment, the first color filter may represent red, the second color filter may represent green, and the third color filter may represent blue.

In an exemplary embodiment, the LCD may further include a first color pixel electrode disposed in the first color pixel area on the first substrate, a first data line connected to the first color pixel electrode, a second color pixel electrode disposed in the second color pixel area on the first substrate, and a second data line connected to the second color pixel electrode, where the second data line is disposed in a center of the first boundary area.

In an exemplary embodiment, a first-side edge of the first overlapping portion may overlap the second data line, and a second-side edge of the first overlapping portion may be disposed between the second data line and the second color pixel area.

In an exemplary embodiment, the second color filter may be disposed on the first color filter in the first overlapping portion.

Another embodiment of the invention disposes an LCD including a first color pixel area, a second color pixel area, and a first boundary area disposed between the first color pixel area and the second color pixel area, including a first substrate and a second substrate facing each other, a first color filter disposed in the first color pixel area and the first boundary area on the first substrate, a second color filter disposed in the second color pixel area and the first boundary area on the first substrate, a third color filter disposed in the first boundary area on the first substrate, and a liquid crystal layer disposed between the first substrate and the second substrate.

In an exemplary embodiment, the first color filter may represent red, the second color filter may represent green, and the third color filter may represent blue.

In an exemplary embodiment, the third color filter may be disposed between the first color filter and the second color filter in the first boundary area.

In an exemplary embodiment, the LCD may further includes a first color pixel electrode disposed in the first color pixel area on the first substrate, a first data line and a second data line connected to the first color pixel electrode, a second color pixel electrode disposed in the second color pixel area on the first substrate, and a third data line and a fourth data line connected to the second color pixel electrode, where the second data line is disposed closer to the first color pixel area than to the second color pixel area in the first boundary area, and the third data line is disposed closer to the second color pixel area than to the first color pixel area in the first boundary area.

In an exemplary embodiment, a first overlapping portion where the first color filter overlaps the third color filter in the first boundary area may be disposed between the second data line and the third data line, and a second overlapping portion where the second color filter overlaps the third color filter in the first boundary area may overlap the third data line.

In an exemplary embodiment, a first overlapping portion where the first color filter overlaps the third color filter in the first boundary area may overlap the second data line, and a second overlapping portion where the second color filter overlaps the third color filter in the first boundary area may overlap the third data line.

A configuration in which a light blocking member overlapping a data line is omitted generates a light leakage phenomenon near the data line, thereby deteriorates a contrast ratio.

In contrast, the LCD according to the exemplary embodiment of the invention has the following effects.

The exemplary embodiment of the invention forms two color filters to overlap each other in a boundary area between the green pixel area and another neighboring pixel area, and the overlapping portion is disposed to be closer to the green pixel area thereby preventing the light leakage phenomenon and improving the contrast ratio.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIG. 1 shows a top plan view for indicating an exemplary embodiment of respective areas of a liquid crystal display ("LCD") according to the invention.

DETAILED DESCRIPTION

Figure 2:
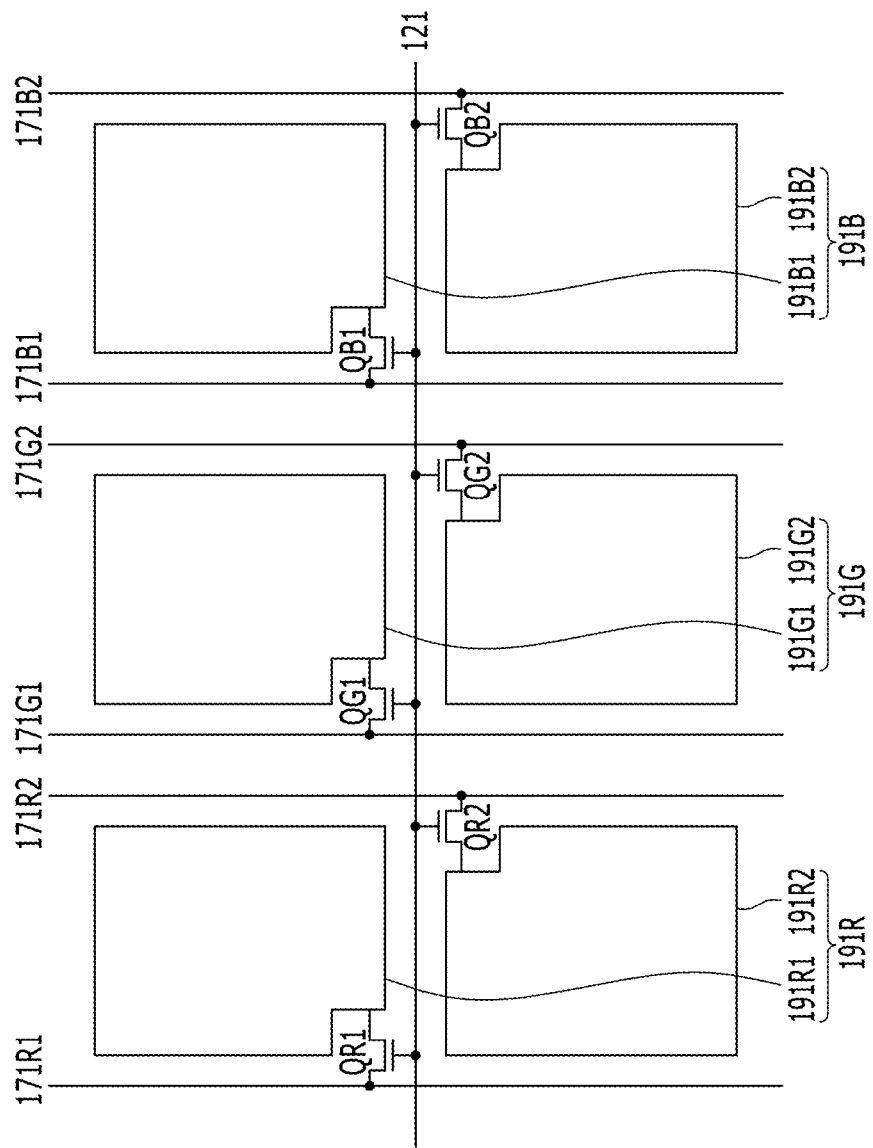
FIG. 2 shows a plan view of an exemplary embodiment of an LCD according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, areas, etc., are exaggerated for clarity. Like reference numerals designate like elements throughout the specification. It will be understood that when an element such as a layer, film, area, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1:
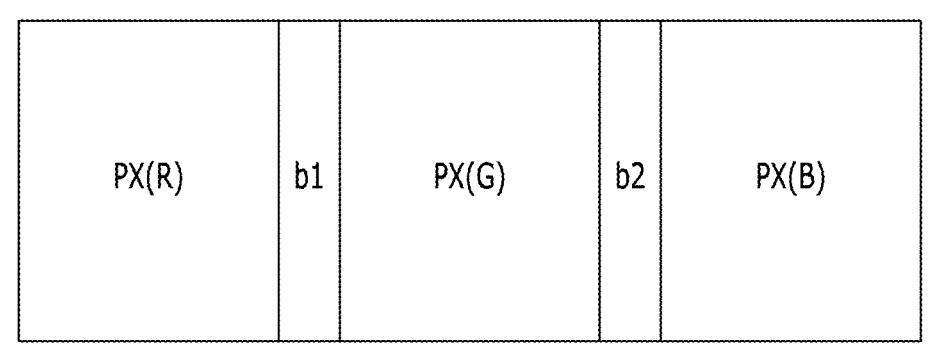

An LCD according to an exemplary embodiment of the invention will now be described with reference to FIGS. 1 and 2.

FIG. 1 shows a top plan view for indicating respective areas of an LCD according to an exemplary embodiment of the invention, and FIG. 2 shows a plan view of an LCD according to an exemplary embodiment of the invention.

As shown in FIG. 1, the LCD includes a plurality of pixel areas configured with a first color pixel area PX(R), a second color pixel area PX(G), and a third color pixel area PX(B). In the illustrated exemplary embodiment, one first color pixel area PX(R), one second color pixel area PX(G), and one third color pixel area PX(B) are shown, but the invention is not restricted thereto, and the LCD may include a plurality of first color pixel areas PX(R), a plurality of second color pixel areas PX(G), and a plurality of third color pixel areas PX(B).

The first color pixel area PX(R), the second color pixel area PX(G), and the third color pixel area PX(B) represent pixel areas for displaying different colors, and combination of the lights respectively having passed through the pixel areas generates white. In an exemplary embodiment, the first color pixel area PX(R) may represent red, the second color pixel area PX(G) may represent green, and the third color pixel area PX(B) may represent blue, for example. Further, the invention is not restricted to the colors, and the first color pixel area PX(R) may represent cyan, the second color pixel area PX(G) may represent magenta, and the third color pixel area PX(B) may represent yellow.

A first boundary area b1 is disposed between the first color pixel area PX(R) and the second color pixel area PX(G). A second boundary area b2 is disposed between the second color pixel area PX(G) and the third color pixel area PX(B). The first to third color pixel areas PX(R), PX(G), and PX(B) represent display areas for displaying a screen, and the first boundary area b1 and the second boundary area b2 represent boundary areas between the display areas and correspond to non-display areas. The non-display area is not usable for displaying of the screen, and it is desirable to prevent the light from coming out of the non-display area for the purpose of displaying the accurate screen because the desired screen cannot be accurately displayed when the light comes out of the non-display area. In an exemplary embodiment, when a black screen is to be displayed, for example, luminance that is higher than the desired screen luminance is displayed because of the light leaking from the non-display area such that the contrast ratio is lowered. Therefore, the contrast ratio may be improved by preventing the light from coming out of the non-display area.

As shown in FIG. 2, the display device includes a plurality of signal lines 121, 171R1, 171R2, 171G1, 171G2, 171B1, and 171B2 and a plurality of pixel electrodes 191R, 191G, and 191B connected thereto.

The signal lines 121, 171R1, 171R2, 171G1, 171G2, 171B1, and 171B2 include a gate line 121 for transmitting a gate signal, a first data line 171R1, a second data line 171R2, a third data line 171G1, a fourth data line 171G2, a fifth data line 171B1, and a sixth data line 171 B2 for transmitting data voltages.

A data voltage for controlling red luminance is applied to the first data line 171R1 and the second data line 171R2, and a second red data voltage applied to the second data line 171R2 is lower than a first red data voltage applied to the first data line 171R1.

A data voltage for controlling green luminance is applied to the third data line 171G1 and the fourth data line 171G2, and a second green data voltage applied to the fourth data line 171G2 is lower than a first green data voltage applied to the third data line 171G1.

A data voltage for controlling blue luminance is applied to the fifth data line 171B1 and the sixth data line 171B2, and a second blue data voltage applied to the sixth data line 171B2 is lower than a first blue data voltage applied to the fifth data line 171B1.

The pixel electrodes 191R, 191G, and 191B include a first color pixel electrode 191R, a second color pixel electrode 191G, and a third color pixel electrode 191B.

The first color pixel electrode 191R is connected to the gate line 121, the first data line 171R1, and the second data line 171R2. The first color pixel electrode 191R includes a first sub-pixel electrode 191R1 and a second sub-pixel electrode 191R2. The first sub-pixel electrode 191R1 is connected to the gate line 121 and the first data line 171R1 through a first switching element QR1. The second sub-pixel electrode 191R2 is connected to the gate line 121 and second data line 171R2 through a second switching element QR2. In an exemplary embodiment, the first and second switching elements QR1 and QR2 may be configured as three-terminal elements such as thin film transistors ("TFTs").

The second color pixel electrode 191G is connected to the gate line 121, the third data line 171G1, and the fourth data line 171G2. The second color pixel electrode 191G includes a third sub-pixel electrode 191G1 and a fourth sub-pixel electrode 191G2. The third sub-pixel electrode 191G1 is connected to the gate line 121 and the third data line 171G1 through a third switching element QG1. The fourth sub-pixel electrode 191G2 is connected to the gate line 121 and the fourth data line 171G2 through a third switching element QG2. In an exemplary embodiment, the third and fourth switching elements QG1 and QG2 may be configured as three-terminal elements such as TFTs.

The third color pixel electrode 191B is connected to the gate line 121, the fifth data line 171B1, and the sixth data line 171B2. The third color pixel electrode 191B includes a fifth sub-pixel electrode 191B1 and a sixth sub-pixel electrode 191B2. The fifth sub-pixel electrode 191B1 is connected to the gate line 121 and the fifth data line 171B1 through a fifth switching element QB1. The sixth sub-pixel electrode 191B2 is connected to the gate line 121 and the sixth data line 171B2 through a sixth switching element QB2. In an exemplary embodiment, the fifth and sixth switching elements QB1 and QB2 may be configured as three-terminal elements such as TFTs.

Regarding an operation of the display device according to an exemplary embodiment of the invention, when a gate-on voltage is applied to the gate line 121, the first to sixth switching elements QR1, QR2, QG1, QG2, QB1, and QB2 connected thereto are turned on, and data voltages that are different from each other are transmitted to the first to sixth sub-pixel electrodes 191R1, 191R2, 191G1, 191G2, 191B1, and 191B2 through the first to sixth data lines 171R1, 171R2, 171G1, 171G2, 171B1, and 171B2.

The second red data voltage transmitted to the second sub-pixel electrode 191R2 is less than the first red data voltage transmitted to the first sub-pixel electrode 191R1, and the first sub-pixel electrode 191R1 and the second sub-pixel electrode 191R2 are charged with different voltages to improve lateral visibility. The second green data voltage transmitted to the fourth sub-pixel electrode 191G2 is less than the first green data voltage transmitted to the third sub-pixel electrode 191G1, and the third sub-pixel electrode 191G1 and the fourth sub-pixel electrode 191G2 are charged with different voltages to improve lateral visibility. The second blue data voltage transmitted to the sixth sub-pixel electrode 191B2 is less than the first blue data voltage transmitted to the fifth sub-pixel electrode 191B1, and the fifth sub-pixel electrode 191B1 and the sixth sub-pixel electrode 191B2 are charged with different voltages to improve lateral visibility.

The first color pixel electrode 191R is disposed in the first color pixel area PX(R), the second color pixel electrode 191G is disposed in the second color pixel area PX(G), and the third color pixel electrode 191B is disposed in the third color pixel area PX(B). The second data line 171R2 and the third data line 171G1 are disposed in the first boundary area b1, and the fourth data line 171G2 and the fifth data line 171B1 are disposed in the second boundary area b2.

In an exemplary embodiment, when the first color pixel area PX(R), the second color pixel area PX(G), and the third color pixel area PX(B) display red, green, and blue respectively, for example, transmittance of the second color pixel area PX(G) representing green is shown to be the highest. Therefore, it is important to prevent the light leakage of the first boundary area b1 and the second boundary area b2 disposed near the second color pixel area PX(G). A configuration of an LCD for preventing light leakage in a first boundary area b1 and a second boundary area b2 according to an exemplary embodiment of the invention will now be described with reference to FIGS. 3 to 5.

Figure 3:
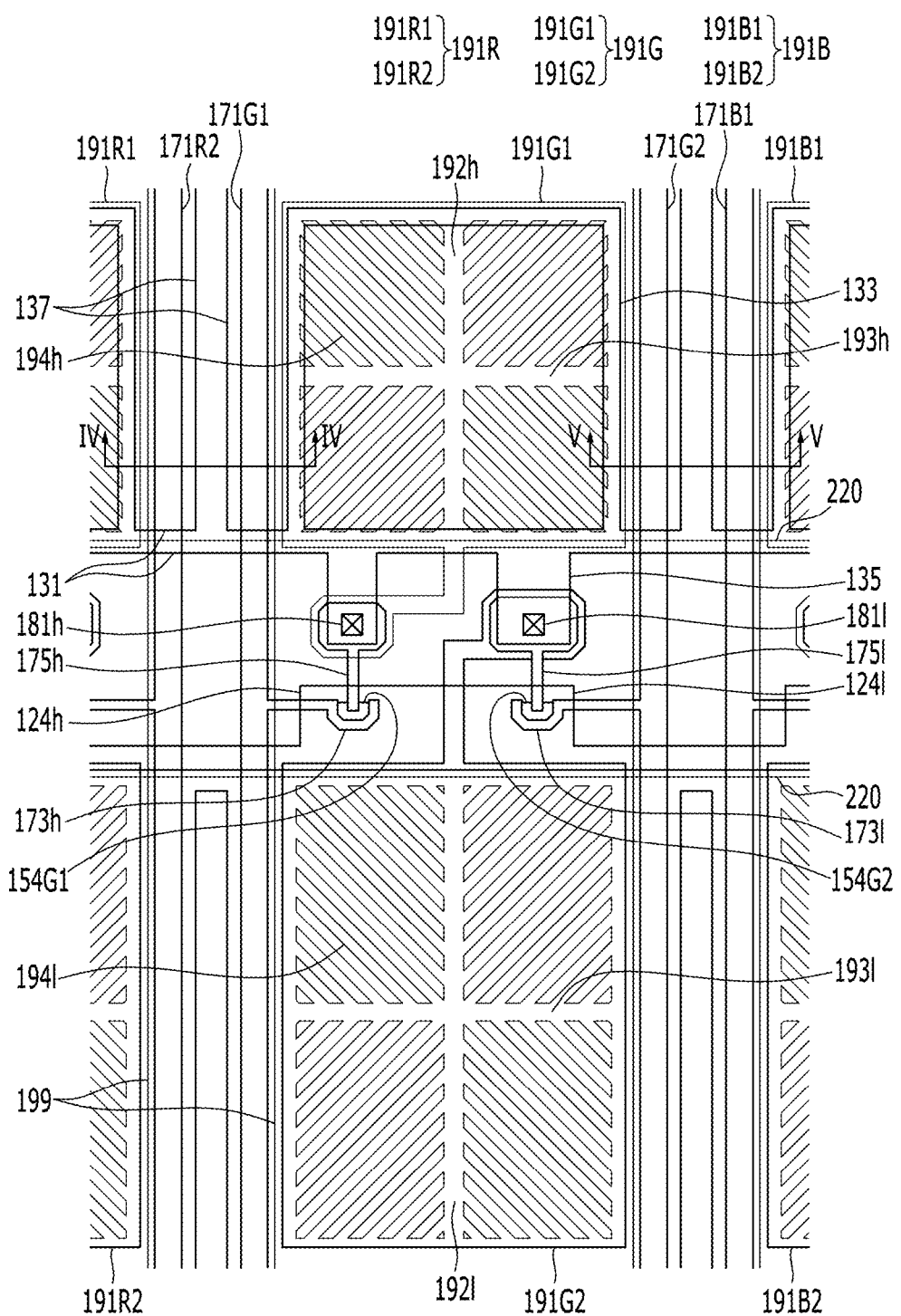
FIG. 3 shows a plan view for indicating an exemplary embodiment of a predetermined area of an LCD according to the invention.
Figure 4:
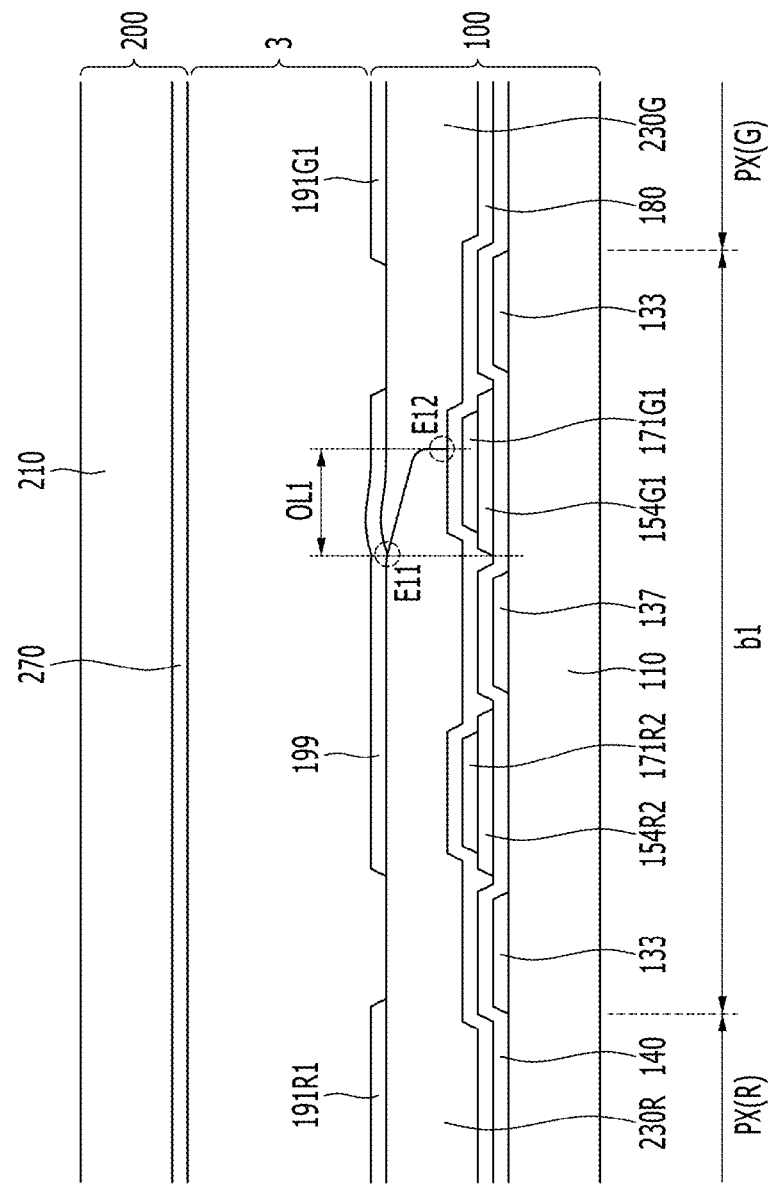
FIG. 4 shows a cross-sectional view of an exemplary embodiment of an LCD according to the invention with respect to line IV-IV of FIG. 3.

FIG. 3 shows a plan view for indicating a predetermined area of an LCD according to an exemplary embodiment of the invention. FIG. 3 shows peripheral areas with respect to the second color pixel area PX(G). FIG. 4 shows a cross-sectional view of an LCD according to an exemplary embodiment of the invention with respect to line IV-IV of FIG. 3, and FIG. 5 shows a cross-sectional view of an LCD according to an exemplary embodiment of the invention with respect to line V-V of FIG. 3.

Figure 5:
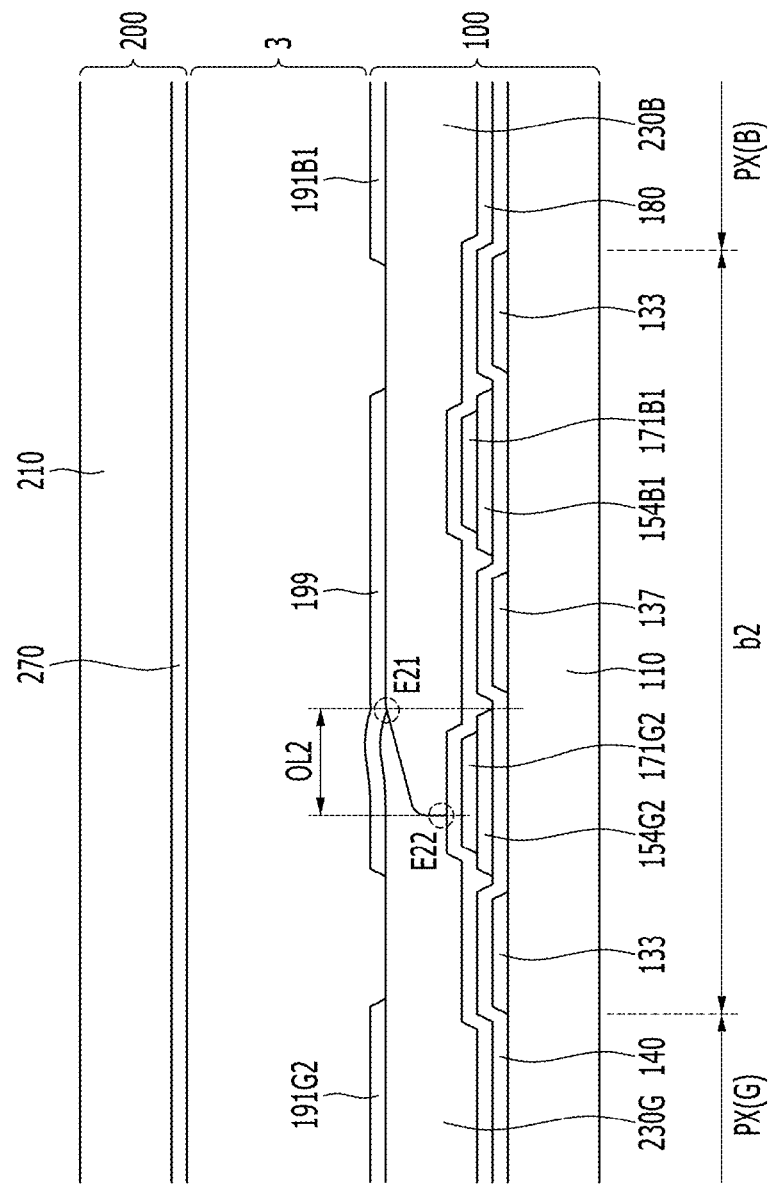
FIG. 5 shows a cross-sectional view of an exemplary embodiment of an LCD according to the invention with respect to line V-V of FIG. 3.

As shown in FIGS. 3 to 5, the LCD includes a lower panel 100 and an upper panel 200 facing each other, and a liquid crystal layer 3 disposed between the display panels 100 and 200.

The lower panel 100 will now be described.

A gate line 121 and a first gate electrode 124$h$ and second gate electrode 124$l$ protruding from the gate line 121 are disposed on a first substrate 110 including transparent glass or plastic.

In an exemplary embodiment, the first substrate 110 may include a bendable material, for example. The LCD may be configured with a curved display device that is bent with a predetermined curvature.

The gate line 121 is mainly extended in a horizontal direction and transmits a gate signal. The first gate electrode 124$h$ and the second gate electrode 124$l$ are protruded to an upper side of the gate line 121 in the plane view. The first gate electrode 124$h$ and the second gate electrode 124$l$ are connected to each other to provide a protrusion. However, the invention is not limited thereto, and protrusion shapes of the first gate electrode 124*h* and second gate electrode 124*l* are modifiable in various ways.

A storage electrode line 131 and storage electrodes 133, 135, and 137 protruded from the storage electrode line 131 may be further disposed on the first substrate 110.

The storage electrode line 131 is extended in parallel with the gate line 121 and is provided to be separate from the gate line 121. A predetermined voltage may be supplied to the storage electrode line 131. The first storage electrode 133 protruded over the storage electrode line 131 is provided to surround edges of the first, third, and fifth sub-pixel electrodes 191R1, 191G1, and 191B1. The second storage electrode 135 protruded below the storage electrode line 131 overlaps a first drain electrode 175*h* and a second drain electrode 171*l*, which will be further described below. The third storage electrode 137 disposed in the first boundary area b1, and the second boundary area b2 is disposed between the second data line 171R2 and the third data line 171G1 and between the fourth data line 171G2 and the fifth data line 171B1. The third storage electrode 137 may prevent light leakage in the first boundary area b1 and the second boundary area b2.

A gate insulating layer 140 is disposed on the gate line 121, the first gate electrode 124*h*, the second gate electrode 124*l*, the storage electrode line 131, and the storage electrodes 133, 135, and 137. In an exemplary embodiment, the gate insulating layer 140 may be provided with an inorganic insulating material such as a silicon nitride (SiNx) or a silicon oxide (SiOx). The gate insulating layer 140 may be provided with a single or multiple layers.

A first semiconductor (not shown), a second semiconductor 15482, a third semiconductor 154G1, a fourth semiconductor 154G2, a fifth semiconductor 154B1, and a sixth semiconductor (not shown) are disposed on the gate insulating layer 140.

The third semiconductor 154G1 may be disposed on the first gate electrode 124*h*, and the fourth semiconductor 154G2 may be disposed on the second gate electrode 124*l*. The third semiconductor 154G1 is disposed below the third data line 171G1, and the fourth semiconductor 154G2 is disposed below the fourth data line 171G2. In a like manner, the second semiconductor 154R2 is disposed below the second data line 171R2, and the fifth semiconductor 154B1 is disposed below the fifth data line 171B1.

In an exemplary embodiment, the first to sixth semiconductors including the second semiconductor 154R2, the third semiconductor 154G1, the fourth semiconductor 154G2 and the fifth semiconductor 154B1 (first and sixth semiconductors not shown) may include at least one of amorphous silicon, polycrystalline silicon, or a metal oxide, for example.

An ohmic contact member (not shown) may be further disposed on the third semiconductor 154G1 and the fourth semiconductor 154G2. In an exemplary embodiment, the ohmic contact member may include a material such as a silicide or n+ hydrogenated amorphous silicon doped in a high concentration with an n-type impurity.

A first data line 171R1, a second data line 171R2, a third data line 171G1, a fourth data line 171G2, a fifth data line 171B1, and a sixth data line 171B2 are disposed on the third semiconductor 154G1, the fourth semiconductor 154G2, and the gate insulating layer 140

A first source electrode 173*h*, a first drain electrode 175*h*, a second source electrode 173*l*, and a second drain electrode 175*l* are also provided.

The first to sixth data lines 171R1, 171R2, 171G1, 171G2, 171B1, and 171B2 transmit data signals and are mainly extended in a vertical direction to cross the gate line 121 and the storage electrode line 131 in a plan view. FIG. 3 shows second to fifth data lines 171R2, 171G1, 171G2, and 171B1 from among six data lines. The second data line 171R2 and the third data line 171G1 are disposed in the first boundary area b1, and the fourth data line 171G2 and the fifth data line 171B1 are disposed in the second boundary area b2.

The second data line 171R2 is disposed closer to the first color pixel area PX(R) than to the second color pixel area PX(G) in the first boundary area b1. The third data line 171G1 is disposed closer to the second color pixel area PX(G) than to the first color pixel area PX(R) in the first boundary area b1. The fourth data line 171G2 is disposed closer to the second color pixel area PX(G) than to the third color pixel area PX(B) in the second boundary area b2. The fifth data line 171B1 is disposed closer to the third color pixel area PX(B) than to the second color pixel area PX(G) in the second boundary area b2.

The first source electrode 173*h* is provided to be protruded over the first gate electrode 124*h* from the third data line 171G1, and the second source electrode 173*l* is provided to be protruded over the second gate electrode 124*l* from the fourth data line 171G2. The first drain electrode 175*h* and the second drain electrode 175*l* include a wide first end portion and a bar-type second end portion. The wide end portion of the first drain electrode 175*h* and the second drain electrode 175*l* overlap the second storage electrode 135. The bar-type end portions of the first drain electrode 175*h* and the second drain electrode 175*l* are partly surrounded by the first source electrode 173*h* and the second source electrode 173*l*.

The first and second gate electrodes 124*h* and 124*l*, the first and second source electrodes 173*h* and 173*l*, and the first and second drain electrodes 175*h* and 175*l* configure third and fourth TFTs QG1 and QG2 respectively together with the third and fourth semiconductors 154G1 and 154G2. In this instance, channels of the TFT are provided on the semiconductor 154G1 between the source electrode 173*h* and the drain electrode 175*h*, and the semiconductor 154G2 between the source electrode 173*l* and the drain electrode 175*l*.

Although not illustrated, constituent elements corresponding to the first gate electrode, the second gate electrode, the first source electrode, the second source electrode, the first drain electrode, and the second drain electrode are disposed in the first color pixel area PX(R) and the third color pixel area PX(B). The above-noted constituent elements configure a first TFT, a second TFT, a fifth TFT, and a sixth TFT together with the first semiconductor, the second semiconductor 154R2, the fifth semiconductor 154B1, and the sixth semiconductor (not shown).

A passivation layer 180 is disposed on the third semiconductor 154G1 exposed among the first to sixth data lines 171R1, 171R2, 171G1, 171G2, 171B1, and 171B2, the first source electrode 173*h*, the first drain electrode 175*h*, the first source electrode 173*h*, and the first drain electrode 175*h*, and on the fourth semiconductor 154G2 exposed among the second source electrode 173*l*, the second drain electrode 175*l*, the second source electrode 173*l*, and the second drain electrode 175*l*. In an exemplary embodiment, the passivation layer 180 may include an organic insulating material or an inorganic insulating material, and may be provided with a single or multiple layers.

A first color filter 230R, a second color filter 230G, and a third color filter 230B are disposed on the passivation layer 180. The first to third color filters 230R, 230G, and 230B may represent one of primary colors including red, green, and blue. However, the first to third color filters 230R, 230G, and 230B are not limited to the three primary colors of red, green, and blue, and they may represent other colors based on cyan, magenta, yellow, and white.

The first color filter 230R is disposed in the first color pixel area PX(R), the second color filter 230G is disposed in the second color pixel area PX(G), and the third color filter 230B is disposed in the third color pixel area PX(B). The first color filter 230R and the second color filter 230G are disposed in the first boundary area b1, and the second color filter 230G and the third color filter 230B are disposed in the second boundary area b2.

The first color filter 230R overlaps the second color filter 230G in the first boundary area b1, and the overlapping portion will be also referred to as a first overlapping portion OL1. The first overlapping portion OL1 is not disposed in a center between the first color pixel area PX(R) and the second color pixel area PX(G). The first overlapping portion OL1 is disposed closer to the second color pixel area PX(G) than to the first color pixel area PX(R). That is, a distance between the first overlapping portion OL1 and the second color pixel area PX(G) is less than a distance between the first overlapping portion OL1 and the first color pixel area PX(R).

A first-side edge E11 of the first overlapping portion OL1 is disposed between the second data line 171R2 and the third data line 171G1. Particularly, the first-side edge E11 of the first overlapping portion OL1 is disposed between the third storage electrode 137 and the third data line 171G1. A second-side edge E12 of the first overlapping portion OL1 overlaps the third data line 171G1.

In an exemplary embodiment, the first color is red, the second color is green, and the third color is blue, for example. The first overlapping portion OL1 is provided closer to the second color pixel area PX(G) so an area occupied by the first color filter 230R is greater than an area occupied by the second color filter 230G in the first boundary area b1. That is, a ratio of the green filter is higher than a ratio of the red filter in the first boundary area b1.

The second color filter 230G overlaps the third color filter 230B in the second boundary area b2, and the overlapping portion will be also referred to as a second overlapping portion OL2. The second overlapping portion OL2 is not disposed in a center between the second color pixel area PX(G) and the third color pixel area PX(B). The second overlapping portion OL2 is disposed closer to the second color pixel area PX(G) than to the third color pixel area PX(B). That is, a distance between the second overlapping portion OL2 and the second color pixel area PX(G) is less than a distance between the second overlapping portion OL2 and the third color pixel area PX(B).

A first-side edge E21 of the second overlapping portion OL2 is disposed between the fourth data line 171G2 and the fifth data line 171B1. Particularly, the first-side edge E21 of the second overlapping portion OL2 is disposed between the third storage electrode 137 and the fourth data line 171G2. A second-side edge E22 of the second overlapping portion OL2 overlaps the fourth data line 171G2.

In an exemplary embodiment, the first color is red, the second color is green, and the third color is blue, for example. The second overlapping portion OL2 is disposed closer to the second color pixel area PX(G) so an area occupied by the third color filter 230B is greater than an area occupied by the second color filter 230G in the second boundary area b2. That is, a ratio of the green filter is higher than a ratio of the blue filter in the second boundary area b2.

The characteristic in which the area overlapped by the neighboring color filter is disposed closer to the second color pixel area PX(G) in the first boundary area b1 and the second boundary area b2 disposed on respective sides of the second color pixel area PX(G) has been described. However, the embodiment of the invention is not restricted to the above-described characteristics, and the area overlapped by the color filter may be disposed closer to the second color pixel area PX(G) in the boundary area of one of the first boundary area b1 and second boundary area b2. In an exemplary embodiment, the first overlapping portion OL1 may be disposed closer to the second color pixel area PX(G) than to the first color pixel area PX(R) in the first boundary area b1, and the second overlapping portion OL2 may be disposed in a center between the third color pixel area PX(B) and the second color pixel area PX(G) in the second boundary area b2. In addition, the second overlapping portion OL2 may be disposed closer to the second color pixel area PX(G) than to the third color pixel area PX(B) in the second boundary area b2, and the first overlapping portion OL1 may be disposed in a center between the second color pixel area PX(G) and the first color pixel area PX(R) in the first boundary area b1.

A first contact hole 181*h* for exposing a wide end portion of the first drain electrode 175*h* and a second contact hole 181*l* for exposing a wide end portion of the second drain electrode 175*l* are defined in the passivation layer 180.

A first color pixel electrode 191R, a second color pixel electrode 191G, and a third color pixel electrode 191B are disposed on the first to third color filters 230R, 230G, and 230B. In an exemplary embodiment, the first to third color pixel electrodes 191R, 191G, and 191B may include a transparent metal oxide such as an indium-tin oxide ("ITO") or an indium-zinc oxide ("IZO").

The first color pixel electrode 191R includes a first sub-pixel electrode 191R1 and a second sub-pixel electrode 191R2 that are separated from each other with reference to the gate line 121 and the storage electrode line 131 therebetween. The second color pixel electrode 191G includes a third sub-pixel electrode 191G1 and a fourth sub-pixel electrode 191G2 that are separated from each other with reference to the gate line 121 and the storage electrode line 131 therebetween. The third color pixel electrode 191B includes a fifth sub-pixel electrode 191B1 and a sixth sub-pixel electrode 191B2 that are separated from each other with reference to the gate line 121 and the storage electrode line 131 therebetween.

The third sub-pixel electrode 191G1 is connected to the first drain electrode 175*h* through the first contact hole 181*h*, and the fourth sub-pixel electrode 191G2 is connected to the second drain electrode 175*l* through the second contact hole 181*l*. Therefore, when the third switching element QG1 and the fourth switching element QG2 are turned on, the third sub-pixel electrode 191G1 and the fourth sub-pixel electrode 191G2 receive different data voltages from the first drain electrode 175*h* and the second drain electrode 175*l*.

In an exemplary embodiment, the third sub-pixel electrode 191G1 and the fourth sub-pixel electrode 191G2 respectively have a quadrangular shape and include a cross stem configured with horizontal stems 193*h* and 193*l* and vertical stems 192*h* and 192*l* crossing the horizontal stems 193*h* and 193*l*. The third sub-pixel electrode 191G1 and the fourth sub-pixel electrode 191G2 include a plurality of fine braches 194*h* and 194*l*.

The second color pixel electrode 191G is divided into eight sub-areas by the horizontal stems 193*h* and 193*l* and the vertical stems 192*h* and 192*l*. The fine branches 194*h* and 194*l* are obliquely extended from the horizontal stems 193*h* and 193*l* and the vertical stems 192*h* and 192*l* In an exemplary embodiment, the fine branches 194*h* and 194*l* may define an angle of about 45 degrees or about 135 degrees with respect to the gate line 121 or the horizontal stems 193*h* and 193*l*. The fine branches 194*h* and 194*l* of the two neighboring sub-areas may be orthogonal to each other.

The third sub-pixel electrode 191G1 and the fourth sub-pixel electrode 191G2 may further include an external stem for connecting edges of the fine branches 194*h* and 194*l* and surrounding the edges, respectively.

A shield electrode 199 may be further disposed on the first to third color filters 230R, 230G, and 230B. A predetermined voltage may be applied to the shield electrode 199. In an exemplary embodiment, the shield electrode 199 may be provided through a same process by using a same material as that of the first to third color pixel electrodes 191R, 191G, and 191B. The shield electrode 199 is disposed in the first boundary area b1 and the second boundary area b2. The shield electrode 199 overlaps the second data line 171R2, the third storage electrode 137, and the third data line 171G1 in the first boundary area b1, and overlaps the fourth data line 171G2, the third storage electrode 137, and the fifth data line 171B1 in the second boundary area b2.

In the illustrated exemplary embodiment, the third sub-pixel electrode 191G1 and the fourth sub-pixel electrode 191G2 have been focused on, but the first sub-pixel electrode 191R1, the second sub-pixel electrode 191R2, the fifth sub-pixel electrode 191B1, and the sixth sub-pixel electrode 191B2 are provided with a similar shape. The first sub-pixel electrode 191R1 is connected to the first switching element QR1, and the second sub-pixel electrode 191R2 is connected to the second switching element QR2. Therefore, when the first switching element QR1 and the second switching element QR2 are turned on, the first sub-pixel electrode 191R1 and the second sub-pixel electrode 191R2 receive different data voltages. The fifth sub-pixel electrode 191B1 is connected to the fifth switching element QR5, and the sixth sub-pixel electrode 191B2 is connected to the sixth switching element QR6. Therefore, when the fifth switching element QR5 and the sixth switching element QR6 are turned on, the fifth sub-pixel electrode 191B1 and the sixth sub-pixel electrode 191B2 receive different data voltages.

The layout form of the pixel, the structure of the TFT, and the shape of the pixel electrode described above are just exemplified, and the invention is not limited thereto and may be variously modified.

The upper panel 200 will now be described.

In an exemplary embodiment, a light blocking member 220 and a common electrode 270 are disposed on a second substrate 210 including transparent glass or plastic, for example.

In an exemplary embodiment, the second substrate 210 may include a bendable material as the first substrate 110. The first substrate 110 and the second substrate 210 may be bent to form a curved display device.

The light blocking member 220 overlaps the gate line 121 and the first to sixth TFTs QR1, QR2, QG1, QG2, QB1, and QB2. The light blocking member 220 is also referred to as a black matrix and prevents light leakage.

The light blocking member 220 does not overlap the first to sixth data lines 171R1, 171R2, 171G1, 191G2, 171B1, and 171B2. When the lower panel 100 and the upper panel 200 are disposed and are bonded together to form a curved display device, the upper panel and the lower panel are misaligned. A case in which the light blocking member 220 is provided to overlap the first to sixth data lines 171R1, 171R2, 171G1, 191G2, 171B1, and 171B2 may be assumed.

When the LCD is bent in the horizontal direction, positions of the first to sixth data lines 171R1, 171R2, 171G1, 191G2, 171B1, and 171B2 disposed on the lower panel 100 and a position of the light blocking member 220 are changed so the light blocking member 220 covers part of the first to third color pixel areas PX(R), PX(G), and PX(B). In order to prevent deterioration of luminance, the light blocking member 220 does not overlap the first to sixth data lines 171R1, 171R2, 171G1, 191G2, 171B1, and 171B2 in the LCD according to an exemplary embodiment of the invention. That is, the light blocking member 220 is not disposed in the first boundary area b1 and the second boundary area b2.

In an exemplary embodiment, the first storage electrode 133, the third storage electrode 137, the second data line 171R2, and the third data line 171G1 are disposed in the first boundary area b1, and generally include a low-resistance opaque metal so they block a substantial amount of the light disposed to the first boundary area b1. However, the light partly transmits through areas including an area between the first storage electrode 133 and the second data line 171R2, an area between the second data line 171R2 and the third storage electrode 137, an area between the third storage electrode 137 and the third data line 171G1, and an area between the third data line 171G1 and the first storage electrode 133, thereby generating leakage of the light.

The first color filter 230R and the second color filter 230G are disposed in the first boundary area b1, and transmittance of the first color filter 230R is lower than transmittance of the second color filter 230G. In the LCD according to an exemplary embodiment of the invention, the first overlapping portion OL1 is disposed closer to the second color pixel area PX(G) in the first boundary area b1 so the area occupied by the first color filter 230R may become greater than that occupied by the second color filter 230G in the first boundary area b1. Therefore, transmittance may be further reduced compared to the case when the first overlapping portion OL1 is disposed in the center in the first boundary area b1. Accordingly, the LCD may increase the contrast ratio by reducing the light leakage generating between opaque metals in the first boundary area b1.

The first storage electrode 133, the third storage electrode 137, the fourth data line 171G2, and the fifth data line 171B1 are disposed in the second boundary area b2, and they are generally including a low-resistance opaque metal so they block a substantial amount of the light provided to the second boundary area b2. However, the light partly transmits through areas including an area between the first storage electrode 133 and the fourth data line 171G2, an area between the fourth data line 171G2 and the third storage electrode 137, an area between the third storage electrode 137 and the fifth data line 171B1, and an area between the fifth data line 171B1 and the first storage electrode 133, thereby generating leakage of the light.

The second color filter 230G and the third color filter 230B are disposed in the second boundary area b2, and transmittance of the third color filter 230B is lower than transmittance of the second color filter 230G. In the LCD according to an exemplary embodiment of the invention, the second overlapping portion OL2 is disposed closer to the second color pixel area PX(G) in the second boundary area b2 so the area occupied by the third color filter 230B may become greater than that occupied by the second color filter 230G in the second boundary area b2. Therefore, transmittance may be further reduced compared to the case when the second overlapping portion OL2 is disposed in the center in the second boundary area b2. Accordingly, the LCD may increase the contrast ratio by reducing the light leakage generating between opaque metals in the second boundary area b2.

In the case of an LCD according to another exemplary embodiment of the invention, the light blocking member 220 may be disposed on the lower panel 100.

The common electrode 270 may be disposed on a side of the second substrate 210, and a predetermined voltage may be applied to the common electrode 270. In an exemplary embodiment, the common electrode 270 may include a transparent metal oxide such as an ITO or an IZO.

Alignment layers (not shown) are disposed inside the display panels 100 and 200, and they may be vertical alignment layers.

Polarizers (not shown) are disposed outside the display panels 100 and 200, transmissive axes of the polarizers are orthogonal to each other, and one of the transmissive axes is desirably parallel to the gate line 121. However, the invention is not limited thereto, and the polarizer may be disposed on one of the outsides of the display panels 100 and 200.

The liquid crystal layer 3 has negative dielectric anisotropy, and a long axis of liquid crystal molecules of the liquid crystal layer 3 is aligned to be perpendicular to surfaces of the display panels 100 and 200 while no electric field is applied. Therefore, the incident light cannot pass through the crossed polarizer but is blocked while there is no electric field.

In an exemplary embodiment, at least one of the liquid crystal layer 3 and the alignment layer may include a photo-reactive material, in detail, a reactive mesogen, for example.

An LCD according to an exemplary embodiment of the invention will now be described with reference to FIGS. 6 and 7.

The LCD shown in FIGS. 6 and 7 mostly corresponds to the LCD described with reference to FIGS. 1 to 5, and no repeated descriptions will be provided. In the exemplary embodiment, positions of the first overlapping portion and the second overlapping portion are different from the above-noted exemplary embodiment, which will now be described.

Figure 6:
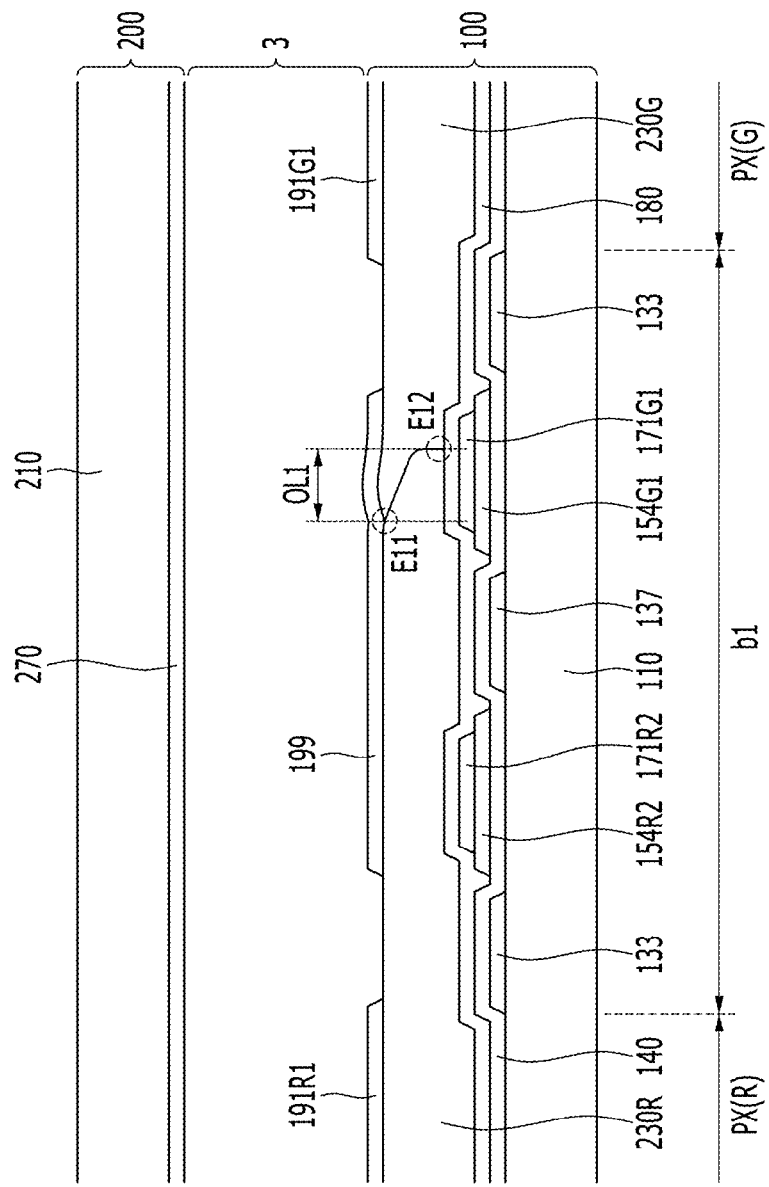
FIGS. 6 and 7 show cross-sectional views of an exemplary embodiment of an LCD according to the invention.
Figure 7:
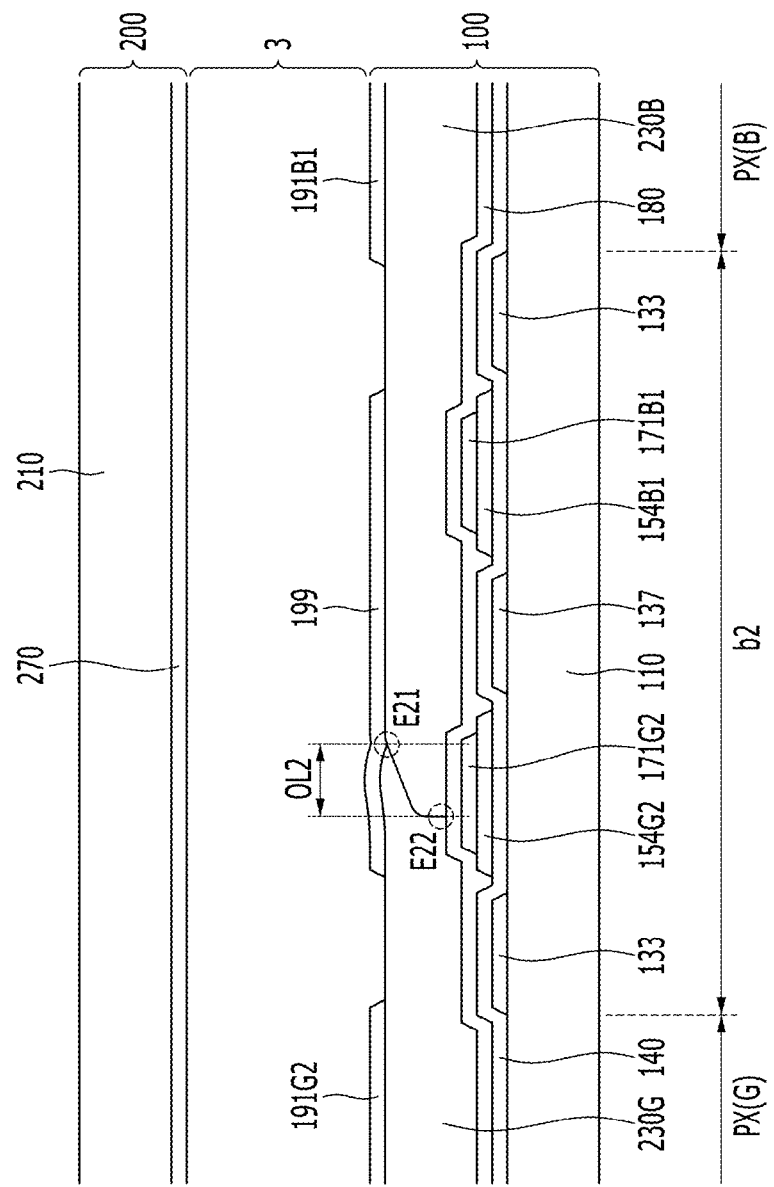

FIGS. 6 and 7 show cross-sectional views of an LCD according to an exemplary embodiment of the invention. FIG. 6 shows peripheral areas with reference to a first boundary area, and FIG. 7 shows peripheral areas with reference to a second boundary area.

In a like manner of the above-described exemplary embodiment, the LCD according to an exemplary embodiment of the invention includes a first color pixel area PX(R), a second color pixel area PX(G), a third color pixel area PX(B), a first boundary area b1 disposed between the first color pixel area PX(R) and the second color pixel area PX(G), and a second boundary area b2 disposed between the second color pixel area PX(G) and the third color pixel area PX(B). In an exemplary embodiment, the first color may be red, the second color may be green, and the third color may be blue, for example.

A first color filter 230R is disposed in the first color pixel area PX(R) and the first boundary area b1 on the first substrate 110. A second color filter 230G is disposed in the second color pixel area PX(G), the first boundary area b1, and the second boundary area b2 on the first substrate 110. A third color filter 230B is disposed in the third color pixel area PX(B) and the second boundary area b2 on the first substrate 110.

The first overlapping portion OL1 where the first color filter 230R overlaps the second color filter 230G in the first boundary area b1 is disposed closer to the second color pixel area PX(G) than to the first color pixel area PX(R). Therefore, the area occupied by the first color filter 230R is greater than the area occupied by the second color filter 230G in the first boundary area b1.

The first-side edge E11 and the second-side edge E12 of the first overlapping portion OL1 overlaps the third data line 171G1. Therefore, the light passing through the area between the first storage electrode 133 and the second data line 171R2, the area between the second data line 171R2 and the third storage electrode 137, and the area between the third storage electrode 137 and the third data line 171G1 in the first boundary area b1 is partially blocked by the first color filter 230R. The transmittance of the first color filter 230R is less than the transmittance of the second color filter 230G thereby reducing light leakage and increasing the contrast ratio compared to the case in which the first overlapping portion OL1 is disposed in the center in the first boundary area b1.

The second overlapping portion OL2 where the second color filter 230G overlaps the third color filter 230B in the second boundary area b2 is disposed closer to the second color pixel area PX(G) than to the third color pixel area PX(B). Therefore, the area occupied by the third color filter 230B is greater than the area occupied by the second color filter 230G in the second boundary area b2.

The first-side edge E21 and the second-side edge E22 of the second overlapping portion OL2 overlap the fourth data line 171G2. Therefore, the light passing through the area between the fourth data line 171G2 and the third storage electrode 137, the area between the third storage electrode 137 and the fifth data line 171B1, and the area between the fifth data line 171B1 and the first storage electrode 133 in the second boundary area b2 is partially blocked by the third color filter 230B. The transmittance of the third color filter 230B is less than the transmittance of the second color filter 230G thereby reducing light leakage and increasing the contrast ratio compared to the case in which the second overlapping portion OL2 is disposed in the center in the second boundary area b2.

An LCD according to an exemplary embodiment of the invention will now be described with reference to FIGS. 8 and 9.

The LCD according to an exemplary embodiment of the invention shown in FIGS. 8 and 9 mostly corresponds to the LCD according to an exemplary embodiment of the invention described with reference to FIGS. 1 to 5. The positions of the first overlapping portion and the second overlapping portion according to the exemplary embodiment are partly different from the above-described exemplary embodiment, which will now be described.

Figure 8:
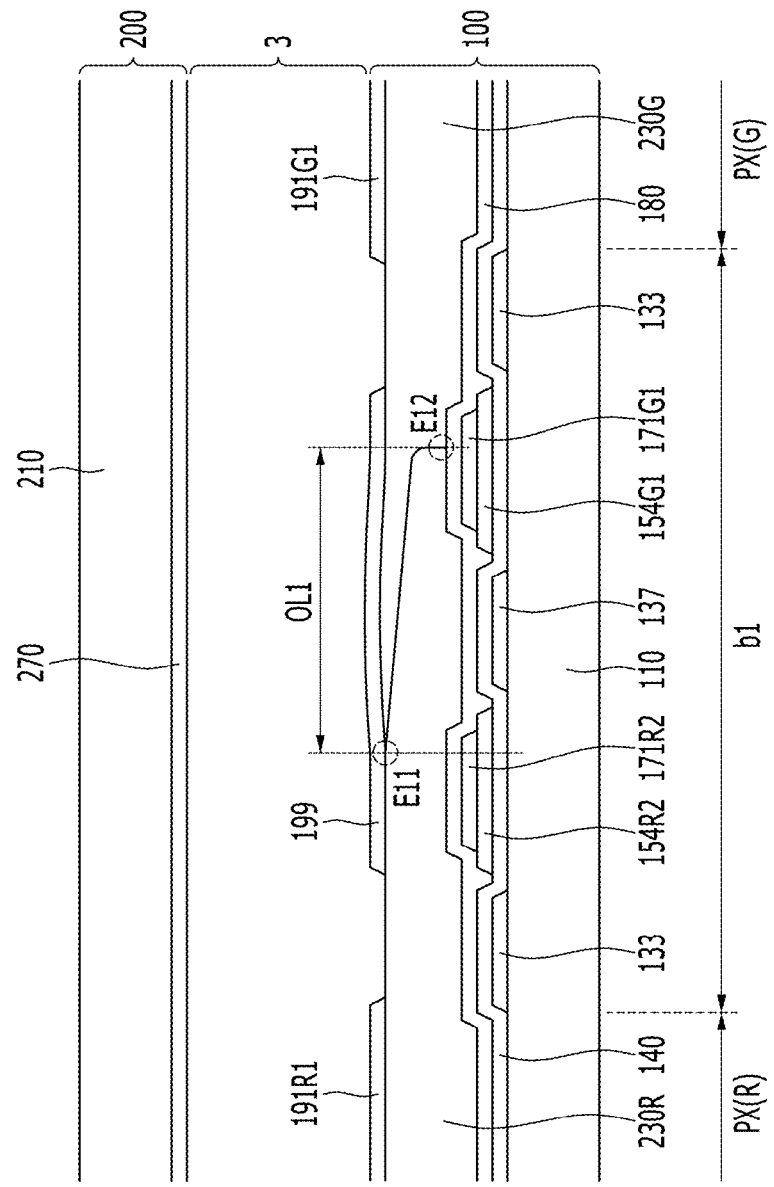
FIGS. 8 and 9 show cross-sectional views of an exemplary embodiment of an LCD according to the invention.
Figure 9:
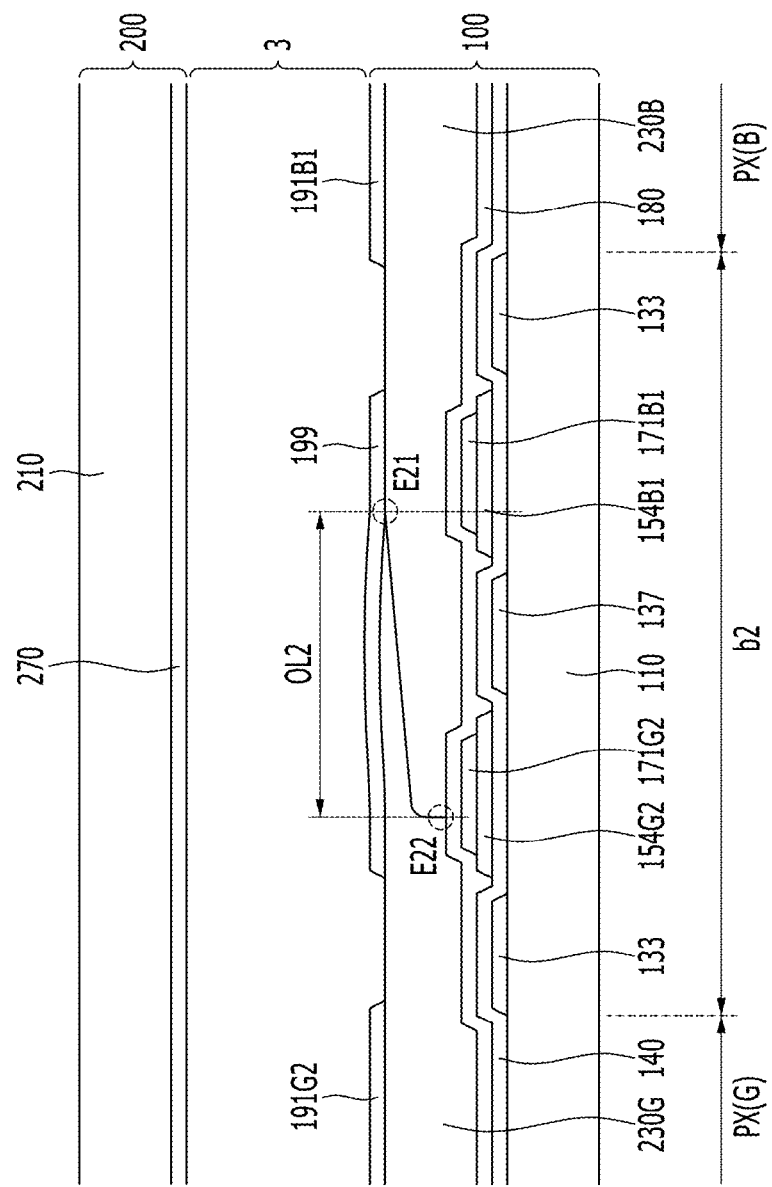

FIGS. 8 and 9 show cross-sectional views of an LCD according to an exemplary embodiment of the invention. FIG. 8 shows peripheral areas with reference to a first boundary area, and FIG. 9 shows peripheral areas with reference to a second boundary area.

In a like manner of the above-described exemplary embodiment, the LCD according to an exemplary embodiment of the invention includes a first color pixel area PX(R), a second color pixel area PX(G), a third color pixel area PX(B), a first boundary area b1 between the first color pixel area PX(R) and the second color pixel area PX(G), and a second boundary area b2 between the second color pixel area PX(G) and the third color pixel area PX(B). In an exemplary embodiment, the first color may be red, the second color may be green, and the third color may be blue, for example.

A first color filter 230R is disposed in the first color pixel area PX(R) and the first boundary area b1 on the first substrate 110. A second color filter 230G is disposed in the second color pixel area PX(G), the first boundary area b1, and the second boundary area b2 on the first substrate 110. A third color filter 230B is disposed in the third color pixel area PX(B) and the second boundary area b2 on the first substrate 110.

The first overlapping portion OL1 where the first color filter 230R overlaps the second color filter 230G in the first boundary area b1 is disposed closer to the second color pixel area PX(G) than to the first color pixel area PX(R). Therefore, the area occupied by the first color filter 230R is greater than the area occupied by the second color filter 230G in the first boundary area b1.

The first-side edge E11 of the first overlapping portion OL1 overlaps the second data line 171R2, and the second-side edge E12 of the first overlapping portion OL1 overlaps the third data line 171G1. Therefore, the light passing through the area between the first storage electrode 133 and the second data line 171R2 in the first boundary area b1 is partially blocked by the first color filter 230R. The light passing through the area between the second data line 171R2 and the third storage electrode 137 and the area between the third storage electrode 137 and the third data line 171G1 is partly blocked by the first color filter 230R and the second color filter 230G. It is desirable to provide the first color filter 230R to be thicker than the second color filter 230G in the first overlapping portion OL1. The transmittance of the first color filter 230R is less than the transmittance of the second color filter 230G so the contrast ratio may be increased by reducing light leakage compared to the case when the first overlapping portion OL1 is disposed in the center in the first boundary area b1.

The second overlapping portion OL2 where the second color filter 230G overlaps the third color filter 230B in the second boundary area b2 is disposed closer to the second color pixel area PX(G) than to the third color pixel area PX(B). Therefore, the area occupied by the third color filter 230B is greater than the area occupied by the second color filter 230G in the second boundary area b2.

A first-side edge E21 of the second overlapping portion OL2 overlaps the fifth data line 171B1, and a second-side edge E22 of the second overlapping portion OL2 overlaps the fourth data line 171G2. Accordingly, light passing through the area between the fourth data line 171G2 and the third storage electrode 137 and the area between the third storage electrode 137 and the fifth data line 171B1 in the second boundary area b2 is partly blocked by the second color filter 230G and the third color filter 230B. The light passing through the area between the fifth data line 171B1 and the first storage electrode 133 is partly blocked by the third color filter 230B. It is desirable to provide the third color filter 230B to be thicker than the second color filter 230G in the second overlapping portion OL2. The transmittance of the third color filter 230B is less than the transmittance of the second color filter 230G so the contrast ratio may be increased by reducing the light leakage compared to the case when the second overlapping portion OL2 is disposed in the center in the second boundary area b2.

An LCD according to an exemplary embodiment of the invention will now be described with reference to FIGS. 10 and 11.

Figure 10:
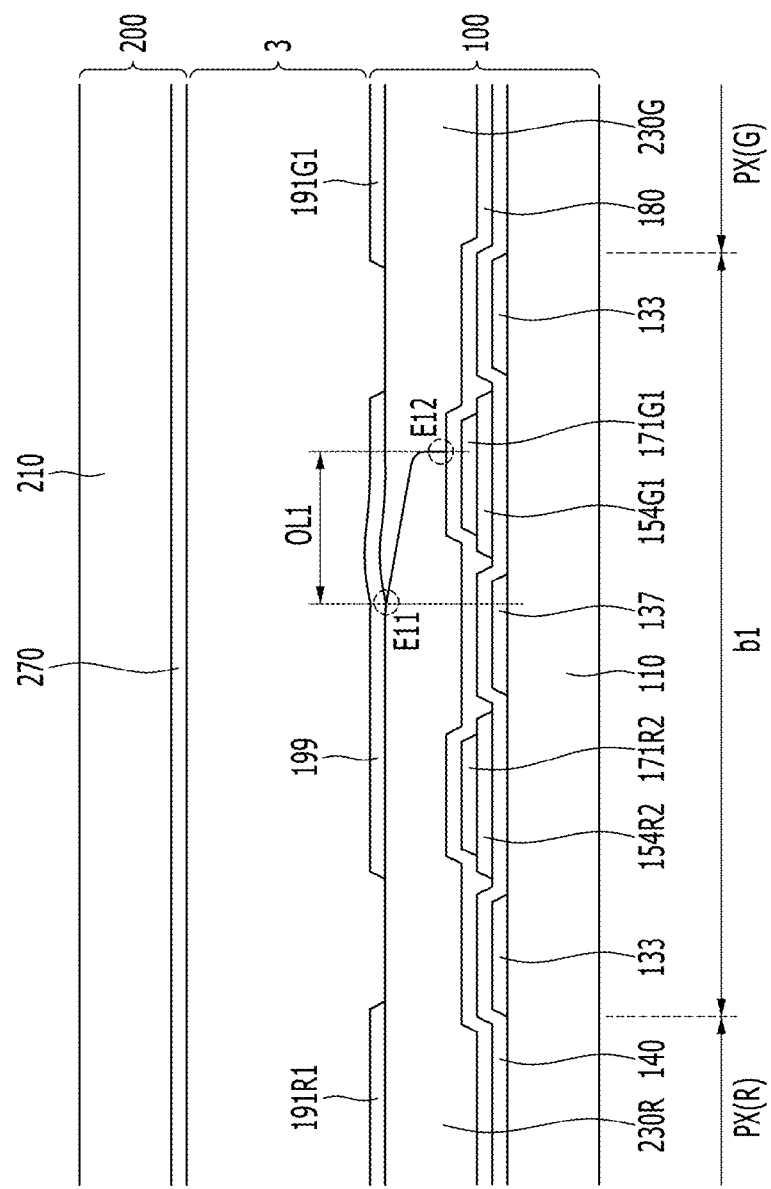
FIGS. 10 and 11 show cross-sectional views of an exemplary embodiment of an LCD according to the invention.
Figure 11:
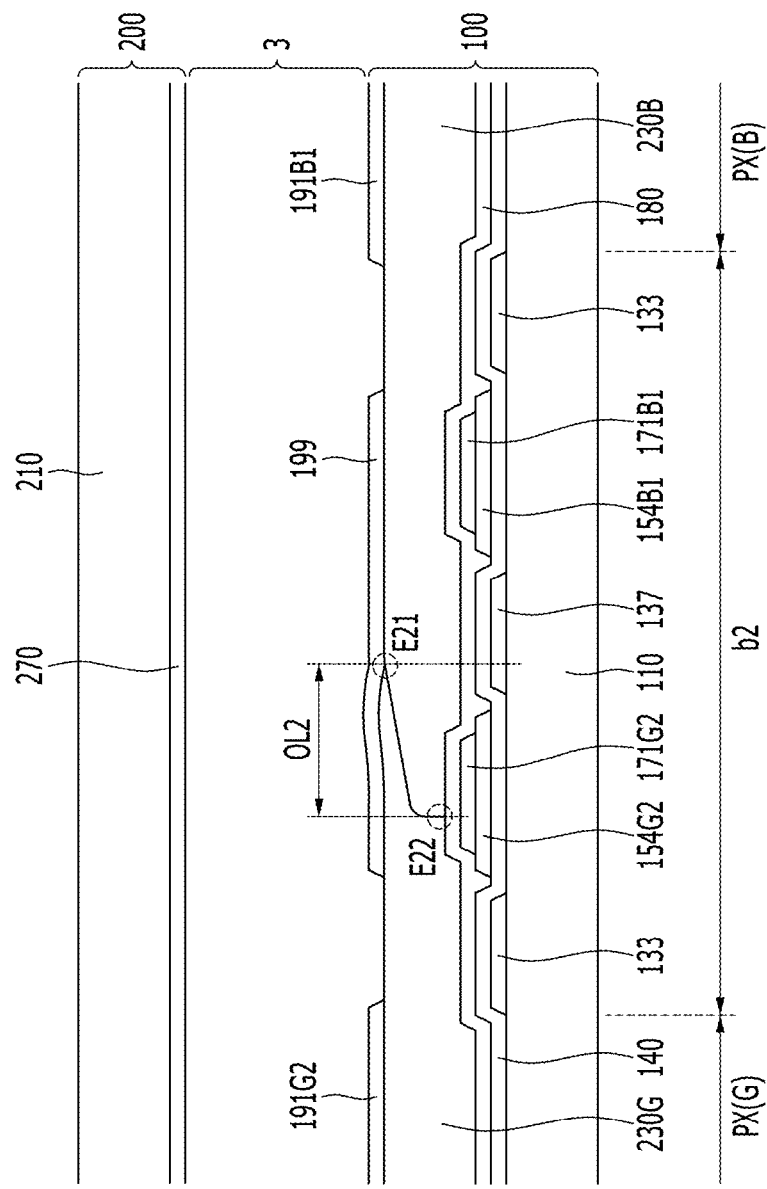

An LCD according to an exemplary embodiment of the invention shown in FIGS. 10 and 11 mostly corresponds to the LCD according to an exemplary embodiment of the invention shown in FIGS. 1 to 5, so no repeated descriptions will be provided. Positions of the first overlapping portion and the second overlapping portion according to the exemplary embodiment are different from the above-described exemplary embodiment, which will now be described.

FIGS. 10 and 11 show cross-sectional views of an LCD according to an exemplary embodiment of the invention. FIG. 10 shows peripheral areas with respect to a first boundary area, and FIG. 11 shows peripheral areas with respect to a second boundary area.

In a like manner of the above-described exemplary embodiment, the LCD according to an exemplary embodiment of the invention includes a first color pixel area PX(R), a second color pixel area PX(G), a third color pixel area PX(B), a first boundary area b1 between the first color pixel area PX(R) and the second color pixel area PX(G), and a second boundary area b2 between the second color pixel area PX(G) and the third color pixel area PX(B). The first color may be red, the second color may be green, and the third color may be blue.

A first color filter 230R is disposed in the first color pixel area PX(R) and the first boundary area b1 on the first substrate 110. A second color filter 230G is disposed in the second color pixel area PX(G), the first boundary area b1, and the second boundary area b2 on the first substrate 110. A third color filter 230B is disposed in the third color pixel area PX(B) and the second boundary area b2 on the first substrate 110.

The first overlapping portion OL1 where the first color filter 230R overlaps the second color filter 230G in the first boundary area b1 is disposed closer to the second color pixel area PX(G) than to the first color pixel area PX(R). Therefore, the area occupied by the first color filter 230R is greater than the area occupied by the second color filter 230G in the first boundary area b1.

The first-side edge E11 of the first overlapping portion OL1 overlaps the third storage electrode 137, and the second-side edge E12 of the first overlapping portion OL1 overlaps the third data line 171G1. Therefore, the light passing through the area between the first storage electrode 133 and the second data line 171R2 and the area between the second data line 171R2 and the third storage electrode 137 in the first boundary area b1 is partially blocked by the first color filter 230R. The light passing through the area between the third storage electrode 137 and the third data line 171G1 is partially blocked by the first color filter 230R and the second color filter 230G. The transmittance of the first color filter 230R is less than the transmittance of the second color filter 230G so the contrast ratio may be increased by reducing light leakage compared to the case when the first overlapping portion OL1 is disposed in the center in the first boundary area b1.

The second overlapping portion OL2 where the second color filter 230G overlaps the third color filter 230B in the second boundary area b2 is disposed closer to the second color pixel area PX(G) than to the third color pixel area PX(B). Therefore, the area occupied by the third color filter 230B is greater than the area occupied by the second color filter 230G in the second boundary area b2.

The first-side edge E21 of the second overlapping portion OL2 overlaps the third storage electrode 137, and the second-side edge E22 of the second overlapping portion OL2 overlaps the fourth data line 171G2. Accordingly, light passing through the area between the fourth data line 171G2 and the third storage electrode 137 in the second boundary area b2 is partly blocked by the second color filter 230G and the third color filter 230B. The light passing through the area between the third storage electrode 137 and the fifth data line 171 B1 and the area between the fifth data line 171 B1 and the first storage electrode 133 is partly blocked by the third color filter 230B. The transmittance of the third color filter 230B is less than the transmittance of the second color filter 230G so the contrast ratio may be increased by reducing the light leakage compared to the case when the second overlapping portion OL2 is disposed in the center in the second boundary area b2.

An LCD according to an exemplary embodiment of the invention will now be described with reference to FIGS. 12 and 13.

Figure 12:
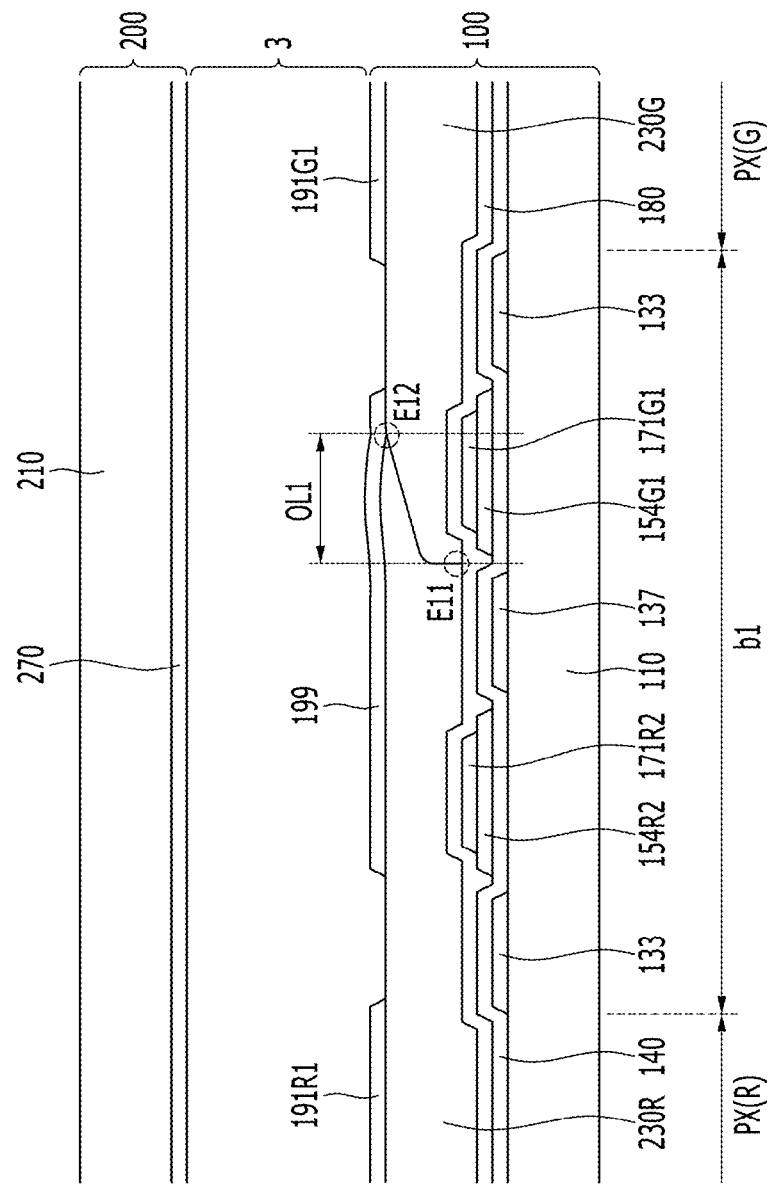
FIGS. 12 and 13 show cross-sectional views of an exemplary embodiment of an LCD according to the invention.
Figure 13:
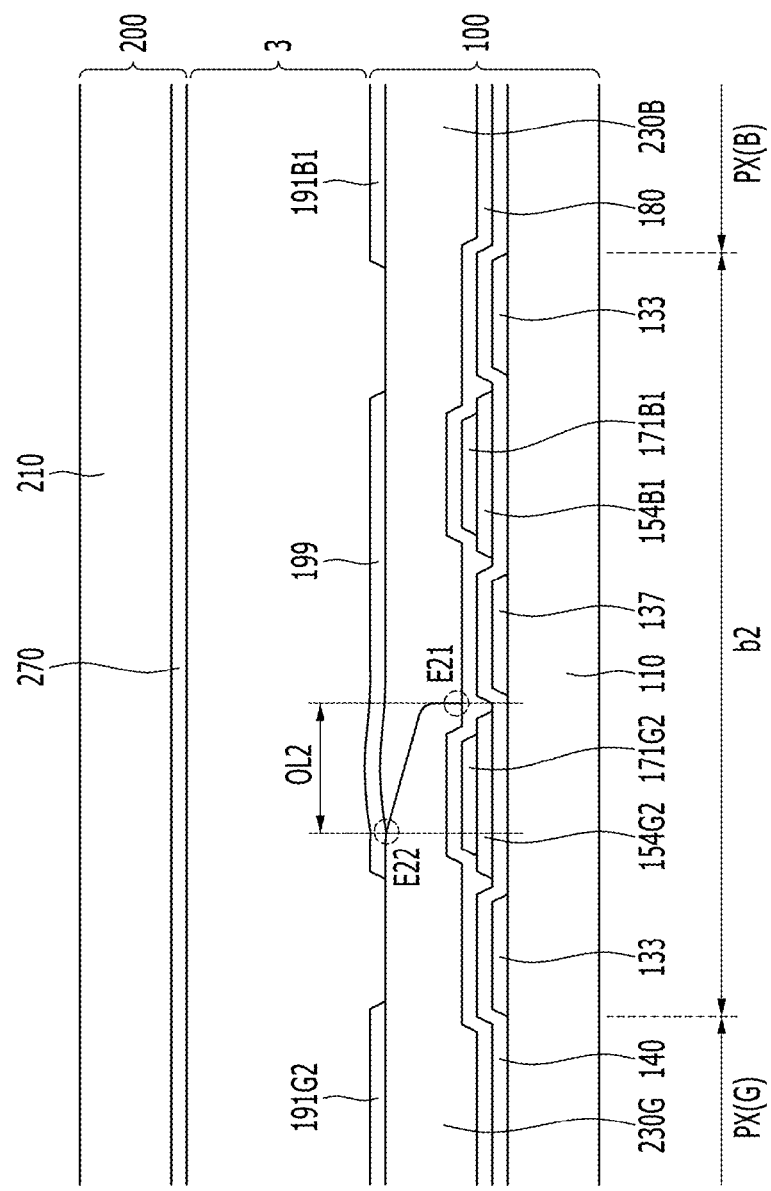

An LCD according to an exemplary embodiment of the invention shown in FIGS. 12 and 13 mostly corresponds to the LCD according to an exemplary embodiment of the invention shown in FIGS. 1 to 5, so no repeated descriptions will be provided. An overlapping order of color filters in the first overlapping portion and the second overlapping portion is different in the exemplary embodiment, which will now be described.

FIGS. 12 and 13 show cross-sectional views of an LCD according to an exemplary embodiment of the invention. FIG. 12 shows peripheral areas with respect to a first boundary area, and FIG. 13 shows peripheral areas with respect to a second boundary area.

While the first color filter 230R is disposed below the second color filter 230G in the first overlapping portion OL1 according to the previous exemplary embodiment, the first color filter 230R is disposed beyond the second color filter 230G in the first overlapping portion OL1 according to the exemplary embodiment.

The first-side edge E11 of the first overlapping portion OL1 is disposed between the second data line 17182 and the third data line 171G1. Particularly, the first-side edge E11 of the first overlapping portion OL1 is disposed between the third storage electrode 137 and the third data line 171G1. The second-side edge E12 of the first overlapping portion OL1 overlaps the third data line 171G1.

However, the exemplary embodiment is not restricted to this, and the first-side edge E11 and the second-side edge E12 of the first overlapping portion OL1 may overlap the third data line 171G1. The first-side edge E11 of the first overlapping portion OL1 may overlap the second data line 171R2, and the second-side edge E12 of the first overlapping portion OL1 may overlap the third data line 171G1. The first-side edge E11 of the first overlapping portion OL1 may overlap the third storage electrode 137, and the second-side edge E12 of the first overlapping portion OL1 may overlap the third data line 171G1.

The first-side edge E21 of the second overlapping portion OL2 is disposed between the fourth data line 171G2 and the fifth data line 171B1. Particularly, the first-side edge E21 of the second overlapping portion OL2 is disposed between the third storage electrode 137 and the fourth data line 171G2. The second-side edge E22 of the second overlapping portion OL2 overlaps the fourth data line 171G2.

However, the exemplary embodiment is not restricted to this, and the first-side edge E21 and the second-side edge E22 of the second overlapping portion OL2 may overlap the fourth data line 171G2. The first-side edge E21 of the second overlapping portion OL2 may overlap the fifth data line 171B1, and the second-side edge E22 of the second overlapping portion OL2 may overlap the fourth data line 171G2. The first-side edge E21 of the second overlapping portion OL2 may overlap the third storage electrode 137, and the second-side edge E22 of the second overlapping portion OL2 may overlap the fourth data line 171G2.

An LCD according to an exemplary embodiment of the invention will now be described with reference to FIGS. 14 to 17.

Figure 14:
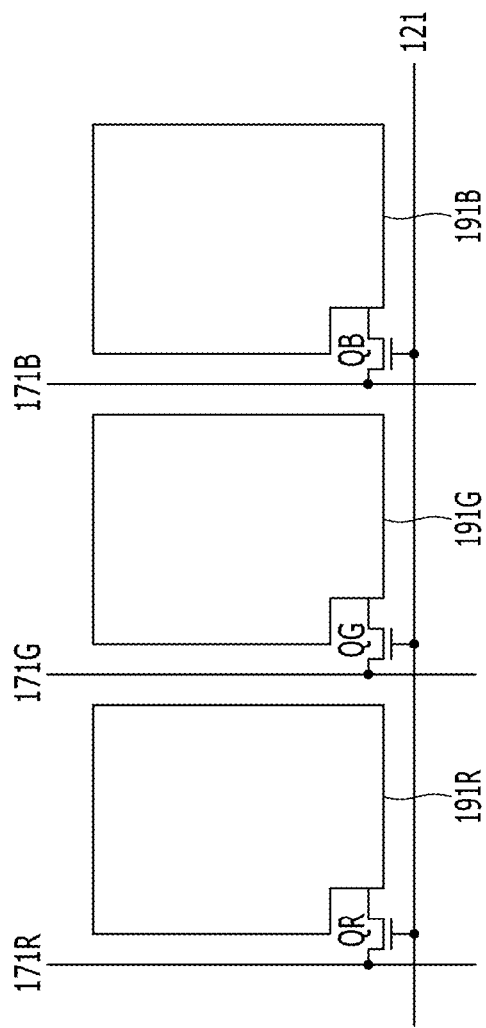
FIG. 14 shows a plan view of an exemplary embodiment of an LCD according to the invention.
Figure 15:
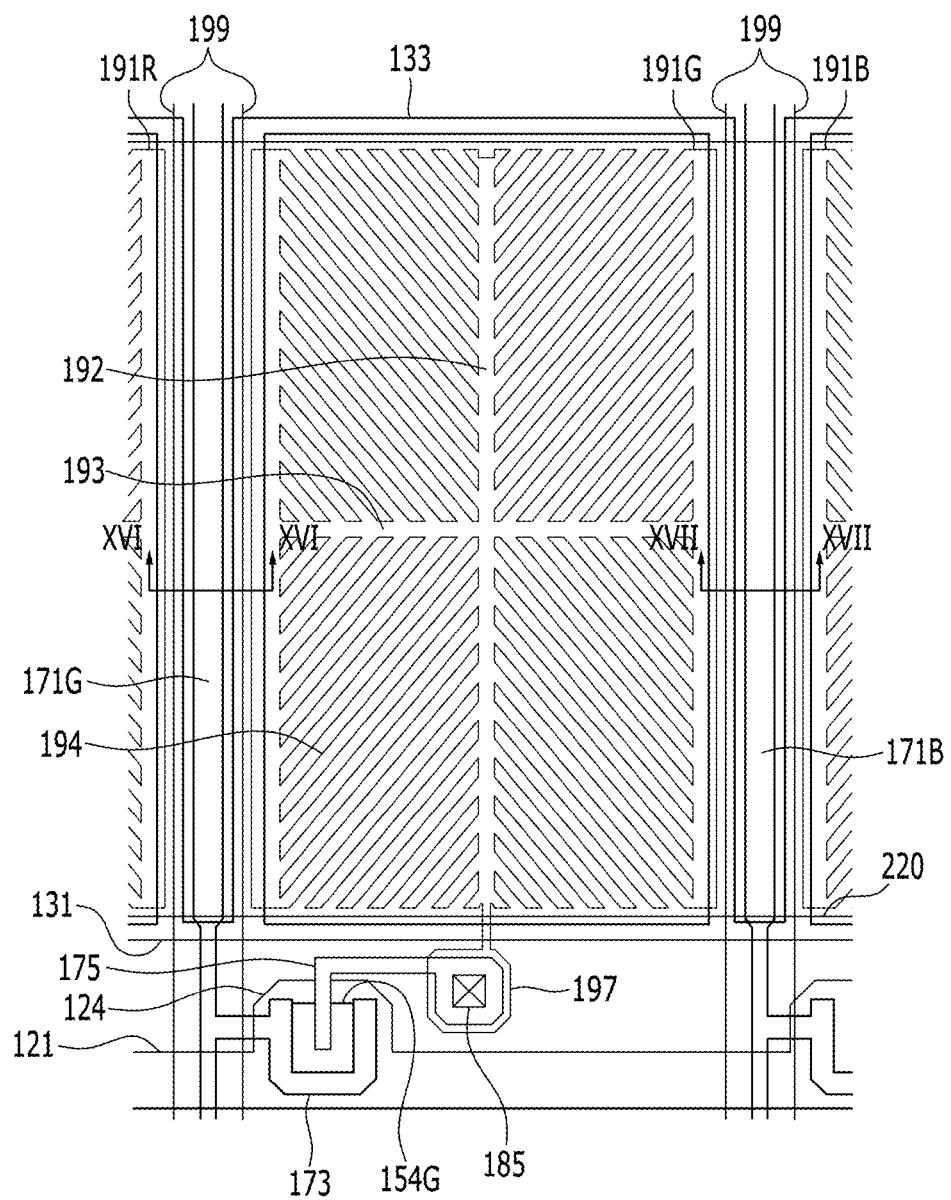
FIG. 15 shows a plan view for indicating an exemplary embodiment of a predetermined area of an LCD according to the invention.
Figure 16:
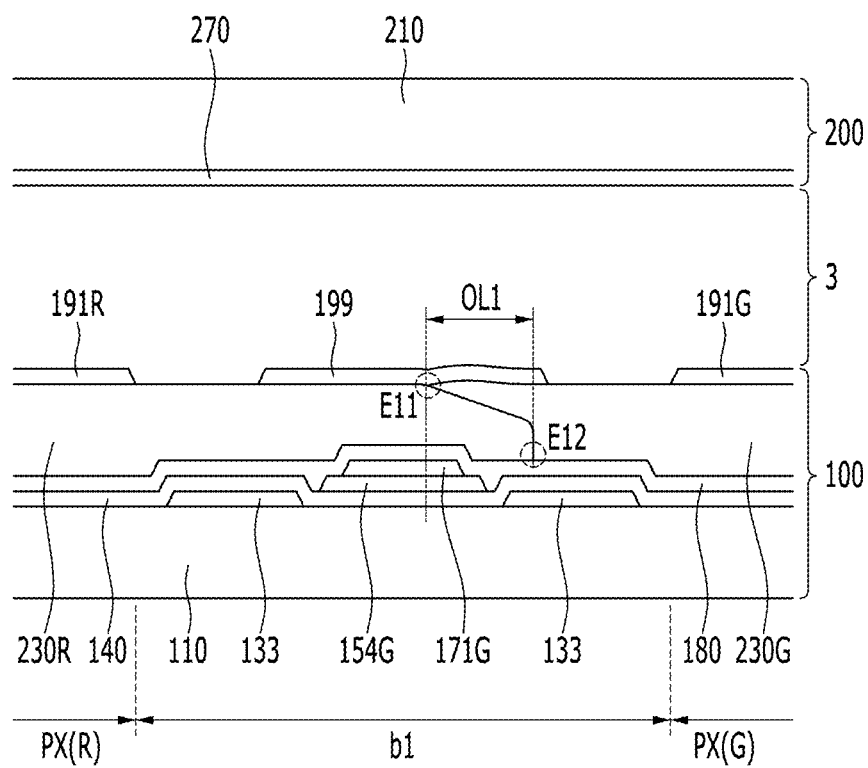
FIG. 16 shows a cross-sectional view of an exemplary embodiment of an LCD according to the invention with respect to line XVI-XVI of FIG. 15.
Figure 17:
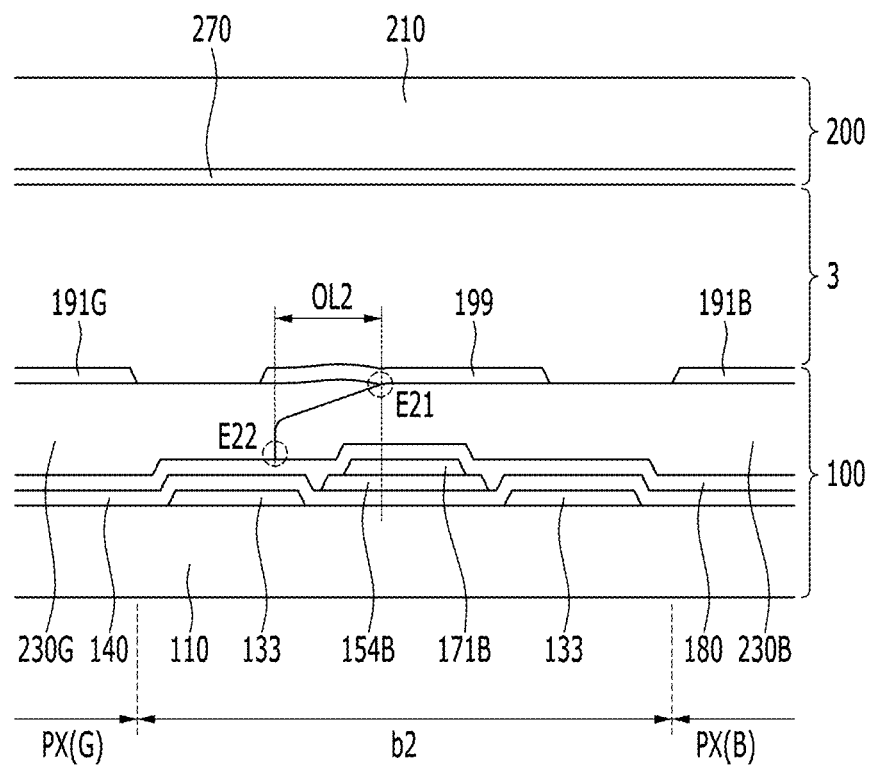
FIG. 17 shows a cross-sectional view of an exemplary embodiment of an LCD according to the invention with respect to line XVII-XVII of FIG. 15.

FIG. 14 shows a plan view of an LCD according to an exemplary embodiment of the invention, and FIG. 15 shows a plan view for indicating a predetermined area of an LCD according to an exemplary embodiment of the invention. FIG. 16 shows a cross-sectional view of an LCD according to an exemplary embodiment of the invention with respect to line XVI-XVI of FIG. 15, and FIG. 17 shows a cross-sectional view of an LCD according to an exemplary embodiment of the invention with respect to line XVII-XVII of FIG. 15.

As shown in FIG. 14, a display device according to an exemplary embodiment of the invention includes a plurality of signal lines 121, 171R, 171G, and 171B and a plurality of pixel electrodes 191R, 191G, and 191B connected thereto.

The signal lines 121, 171R, 171G, and 171B include a gate line 121 for transmitting a gate signal, and a first data line 171R, a second data line 171G, and a third data line 171B for transmitting data voltages.

In an exemplary embodiment, a data voltage for controlling red luminance is applied to the first data line 171R, a data voltage for controlling green luminance is applied to the second data line 171G, and a data voltage for controlling blue luminance is applied to the third data line 171B, for example.

A plurality of pixel electrodes 191R, 191G, and 191B include a first color pixel electrode 191R, a second color pixel electrode 191G, and a third color pixel electrode 191B.

The first color pixel electrode 191R is connected to the gate line 121 and the first data line 171R through the first switching element QR. In an exemplary embodiment, the first switching element QR may be configured as a three-terminal element such as a TFT, for example.

The second color pixel electrode 191G is connected to the gate line 121 and the second data line 171G through the second switching element QG. In an exemplary embodiment, the second switching element QG may be configured as a three-terminal element such as a TFT, for example.

The third color pixel electrode 191B is connected to the gate line 121 and the third data line 171B through the third switching element QB. In an exemplary embodiment, the third switching element QB may be configured as a three-terminal element such as a TFT, for example.

Referring to FIGS. 1 and 14, the first color pixel electrode 191R is disposed in the first color pixel area PX(R), the second color pixel electrode 191G is disposed in the second color pixel area PX(G), and the third color pixel electrode 191B is disposed in the third color pixel area PX(B). The second data line 171G is disposed in the first boundary area b1, and the third data line 171B is disposed in the second boundary area b2.

As shown in FIGS. 15 to 17, the LCD according to an exemplary embodiment of the invention includes a lower panel 100 and an upper panel 200 facing each other, and a liquid crystal layer 3 disposed between the display panels 100 and 200.

The lower panel 100 will now be described.

A gate line 121 and a gate electrode 124 protruded at the gate line 121 are disposed on the first substrate 110 including transparent glass or plastic, for example.

In an exemplary embodiment, the first substrate 110 may be provided with a bendable material. The LCD according to an exemplary embodiment of the invention may be provided to be a curved display device that is bendable with a predetermined curvature.

The gate line 121 is mainly extended in the horizontal direction and transmits the gate signal.

A storage electrode line 131 and a first storage electrode 133 protruded at the storage electrode line 131 may be further disposed on the first substrate 110.

The storage electrode line 131 is extended in parallel with the gate line 121, and is provided to be separate from the gate line 121. A predetermined voltage may be applied to the storage electrode line 131. The first storage electrode 133 is provided to surround edges of the first, second, and third pixel electrodes 191R, 191G, and 191B.

A gate insulating layer 140 is disposed on the gate line 121, the gate electrode 124, the storage electrode line 131, and the first storage electrode 133. In an exemplary embodiment, the gate insulating layer 140 may include an inorganic insulating material such as a silicon nitride (SiNx) or a silicon oxide (SiOx). The gate insulating layer 140 may be provided with a single or multiple layers.

A first semiconductor (not shown), a second semiconductor 154G, and a third semiconductor 154B are disposed on the gate insulating layer 140.

The second semiconductor 154G may be disposed beyond the gate electrode 124 or below the second data line 171G. In a like manner, the third semiconductor 154B may be disposed below the third data line 171B.

In an exemplary embodiment, the first to third semiconductors (not shown, 154G, and 154B) may include at least one of an amorphous silicon, a polycrystalline silicon, and a metal oxide, for example.

A first data line 171R, a second data line 171G, and a third data line 171B are disposed on the first to third semiconductors (not shown, 154G, and 154B) and the gate insulating layer 140. A source electrode 173 and a drain electrode 175 are also provided.

The first to third data lines 171R, 171G, and 171B transmit data signals and are mainly extended in the vertical direction to cross the gate line 121 and the storage electrode line 131. FIG. 15 shows the second data line 171G and the third data line 171B from among the three data lines. The second data line 171G is disposed in the first boundary area b1, and the third data line 171B is disposed in the second boundary area b2. Particularly, the second data line 171G may be disposed in the center of the first boundary area b1, and the third data line 171B may be disposed in the center of the second boundary area b2.

The source electrode 173 is provided to be protruded over the gate electrode 124 from the second data line 171G. The drain electrode 175 includes a wide first end portion and a bar-type second end portion The wide end portion of the drain electrode 175 overlaps the second color pixel electrode 191G. The bar-type end portion of the drain electrode 175 is partly surrounded by the source electrode 173

The gate electrode 124, the source electrode 173, and the drain electrode 175 form a second TFT QG with the second semiconductor 154G. A channel of the TFT is disposed on the semiconductor 154G between the source electrode 173 and the drain electrode 175.

Although not shown, constituent elements corresponding to a gate electrode, a source electrode, and a drain electrode are disposed in the first color pixel area PX(R) and the third color pixel electrode PX(B). The constituent elements configure a first switching element QR and a third switching element QB together with the first semiconductor and the third semiconductor.

A passivation layer 180 is disposed on the first data line to the third data line 171R, 171G, and 171B, the source electrode 173, the drain electrode 175, and the second semiconductor 154G exposed between the source electrode 173 and the drain electrode 175. In an exemplary embodiment, the passivation layer 180 may be provided with an organic insulating material or an inorganic insulating material, and may be provided with a single or multiple layers.

A first color filter 230R, a second color filter 230G, and a third color filter 230B are disposed on the passivation layer 180. In an exemplary embodiment, the first color filter 230R may be provided with a red filter, the second color filter 230G may be provided with a green filter, and the third color filter 230B may be provided with a blue filter.

The first color filter 230R is disposed in the first color pixel area PX(R), the second color filter 230G is disposed in the second color pixel area PX(G), and the third color filter 230B is disposed in the third color pixel area PX(B). The first color filter 230R and the second color filter 230G are disposed in the first boundary area b1, and the second color filter 230G and the third color filter 230B are disposed in the second boundary area b2.

The first color filter 230R overlaps the second color filter 230G in the first boundary area b1, and the overlapping portion will be referred to as a first overlapping portion OL1. The first overlapping portion OL1 is not disposed in a center between the first color pixel area PX(R) and the second color pixel area PX(R). The first overlapping portion OL1 is disposed closer to the second color pixel area PX(G) than to the first color pixel area PX(R). That is, a distance between the first overlapping portion OL1 and the second color pixel area PX(G) is less than a distance between the first overlapping portion OL1 and the first color pixel area PX(R).

The first-side edge E11 of the first overlapping portion OL1 overlaps the second data line 171G, and the second-side edge E12 of the first overlapping portion OL1 is disposed between the second data line 171G and the second color pixel area PX(G). Particularly, the second-side edge E12 of the first overlapping portion OL1 may overlap the first storage electrode 133 between the second data line 171G and the second color pixel area PX(G).

The first color is red, the second color is green, and the third color is blue. The first overlapping portion OL1 is disposed closer to the second color pixel area PX(G) so an area occupied by the first color filter 230R is greater than an area occupied by the second color filter 230G in the first boundary area b1. That is, a ratio of the green filter is higher than a ratio of the red filter in the first boundary area b1.

The second color filter 230G overlaps the third color filter 230B in the second boundary area b2, and the overlapping portion will be referred to as a second overlapping portion OL2. The second overlapping portion OL2 is not disposed in a center between the second color pixel area PX(G) and the third color pixel area PX(B). The second overlapping portion OL2 is disposed closer to the second color pixel area PX(G) than to the third color pixel area PX(B). That is, a distance between the second overlapping portion OL2 and the second color pixel area PX(G) is less than a distance between the second overlapping portion OL2 and the third color pixel area PX(B).

The first-side edge E21 of the second overlapping portion OL2 overlaps the third data line 171B, and the second-side edge E22 of the second overlapping portion OL2 is disposed between the third data line 171B and the second color pixel area PX(G). Particularly, the second-side edge E22 of the second overlapping portion OL2 may overlap the first storage electrode 133 between the third data line 171B and the second color pixel area PX(G).

In an exemplary embodiment, the first color is red, the second color is green, and the third color is blue, for example. The second overlapping portion OL2 is disposed closer to the second color pixel area PX(G) so an area occupied by the third color filter 230B is greater than an area occupied by the second color filter 230G in the second boundary area b2. That is, a ratio of the green filter is higher than a ratio of the blue filter in the second boundary area b2.

The characteristic in which the area overlapped by the neighboring color filter is disposed closer to the second color pixel area PX(G) in the first boundary area b1 and the second boundary area b2 provided on respective sides of the second color pixel area PX(G) has been described. However, the embodiment of the invention is not restricted to the above-described characteristic, and the area overlapped by the color filter may be disposed closer to the second color pixel area PX(G) in the boundary area of one of the first boundary area b1 and second boundary area b2.

A contact hole 185 for exposing the wide end portion of the drain electrode 175 is defined in the passivation layer 180.

A first color pixel electrode 191R, a second color pixel electrode 191G, and a third color pixel electrode 191B are disposed on the first to third color filters 230R, 230G, and 230B. In an exemplary embodiment, the first to third color pixel electrodes 191R, 191G, and 191B may be provided with a transparent metal oxide such as an ITO or an IZO.

In an exemplary embodiment, the second color pixel electrode 191G has a quadrangular shape, and includes a cross stem configured with a horizontal stem 193 and a vertical stem 192 crossing the horizontal stem 193, and a plurality of fine branches 194. The second color pixel electrode 191G may further include an external stem for connecting an edge of the fine branches 194. The first color pixel electrode 191R and the third color pixel electrode 191B may be configured with a similar form to that of the second color pixel electrode 191G.

A shield electrode 199 may be further disposed on the first to third color filters 230R, 230G, and 230B. A predetermined voltage may be applied to the shield electrode 199. The shield electrode 199 may be provided by a same process with a same material as the first to third color pixel electrodes 191R, 191G, and 191B. The shield electrode 199 is disposed in the first boundary area b1 and the second boundary area b2. The shield electrode 191 overlaps the second data line 171G and the first storage electrode 133 in the first boundary area b1, and overlaps the third data line 171B and first storage electrode 133 in the second boundary area b2.

The upper panel 200 will now be described.

A light blocking member 220 and a common electrode 270 are disposed on the second substrate 210 including transparent glass or plastic.

The second substrate 210 may include a bendable material in a like manner of the first substrate 110. The first substrate 110 and the second substrate 210 may be bent to form a curved display device.

The light blocking member 220 overlaps the gate line 121 and the first to third TFTs QR, QG, and QB. The light blocking member 220 does not overlap the first to third data lines 171R, 171G, and 171B. That is, the light blocking member 220 is not disposed in the first boundary area b1 and the second boundary area b2.

A first storage electrode 133 and a second data line 171G are disposed in the first boundary area b1, and some of the light passes through an area between the first storage electrode 133 and the second data line 171G to generate leakage of light.

A first color filter 230R and a second color filter 230G are disposed in the in the first boundary area b1, and transmittance of the first color filter 230R is less than transmittance of the second color filter 230G. Regarding the LCD according to an exemplary embodiment of the invention, the first overlapping portion OL1 is disposed closer to the second color pixel area PX(G) in the first boundary area b1 so that the area occupied by the first color filter 230R may be greater than the area occupied by the second color filter 230G in the first boundary area b1. Therefore, the transmittance may be further reduced than the case when the first overlapping portion OL1 is disposed in the center in the first boundary area b1. The LCD according to an exemplary embodiment of the invention may increase the contrast ratio by reducing the light leakage occurring between opaque metals in the first boundary area b1.

A first storage electrode 133 and a third data line 171B are disposed in the second boundary area b2, and some of the light passes through the area between the first storage electrode 133 and the third data line 171B to induce leakage of light.

A second color filter 230G and a third color filter 230B are disposed in the second boundary area b2, and transmittance of the third color filter 230B is less than transmittance of the second color filter 230G. Regarding the LCD according to an exemplary embodiment of the invention, the second overlapping portion OL2 is disposed closer to the second color pixel area PX(G) in the first boundary area b1 so that the area occupied by the third color filter 230B may be greater than the area occupied by the second color filter 230G in the second boundary area b2. Therefore, the transmittance may be further reduced than the case when the second overlapping portion OL2 is disposed in the center in the second boundary area b2. The LCD according to an exemplary embodiment of the invention may increase the contrast ratio by reducing the light leakage occurring between opaque metals in the second boundary area b2.

In the case of an LCD according to another exemplary embodiment of the invention, the light blocking member 220 may be disposed on the lower panel 100.

A common electrode 270 may be disposed on a side of the second substrate 210, and a predetermined voltage may be applied to the common electrode 270. The common electrode 270 may be provided with a transparent metal oxide such as an ITO or an IZO.

Alignments layer (not shown) are disposed inside the display panels 100 and 200, and polarizers (not shown) are disposed outside the display panels 100 and 200.

An LCD according to an exemplary embodiment of the invention will now be described with reference to FIG. 18.

The LCD shown in FIG. 18 mostly corresponds to the LCD described with reference to FIGS. 1 to 5, and no repeated descriptions will be provided. The exemplary embodiment is partly differently from the previous exemplary embodiment in that a third color filter is further disposed in the first boundary area, which will now be described.

Figure 18:
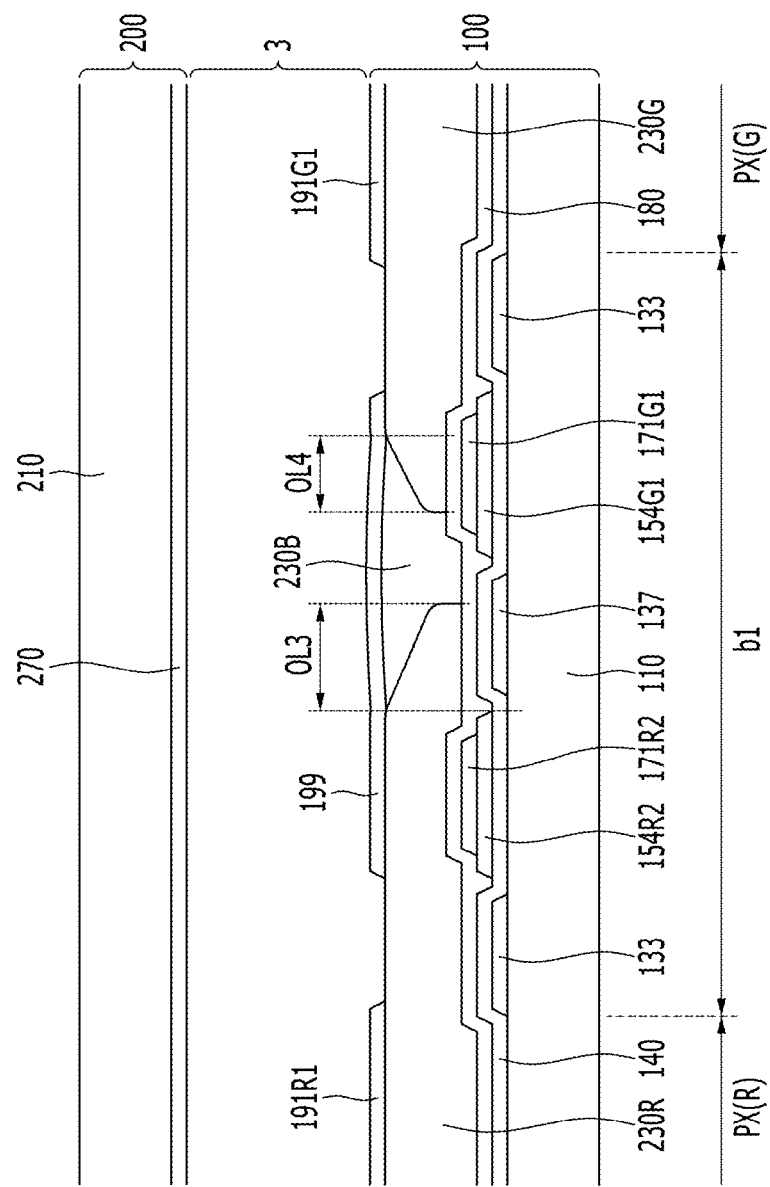
FIG. 18 shows a cross-sectional view of an exemplary embodiment of an LCD according to the invention.

FIG. 18 shows a cross-sectional view of an LCD according to an exemplary embodiment of the invention. FIG. 18 shows peripheral areas with respect to a first boundary area.

In a like manner of the previous exemplary embodiment, the LCD according to an exemplary embodiment of the invention includes a first color pixel area PX(R), a second color pixel area PX(G), and a first boundary area b1 disposed between the first color pixel area PX(R) and the second color pixel area PX(G).

A first color filter 230R is disposed in the first color pixel area PX(R) and the first boundary area b1 on the first substrate 110. A second color filter 230G is disposed in the second color pixel area PX(G) and the first boundary area b1 on the first substrate 110. A third color filter 230B is disposed in the first boundary area b1 on the first substrate 110. In an exemplary embodiment, the first color may be red, the second may be green, and the third may be blue.

The second data line 171R2 and the third data line 171G1 are disposed in the first boundary area b1. The second data line 171R2 is disposed closer to the first color pixel area PX(R) than to the second color pixel area PX(G) in the first boundary area b1. The third data line 171G1 is disposed closer to the second color pixel area PX(G) than to the first color pixel area PX(R) in the first boundary area b1.

The third color filter 230B is disposed between the first color filter 230R and the second color filter 230G in the first boundary area b1. The first color filter 230R overlaps the third color filter 230B and the second color filter 230G overlaps the third color filter 230B in the first boundary area b1. The first color filter 230R does not overlap the second color filter 230G.

An area where the first color filter 230R overlaps the third color filter 230B in the first boundary area b1 is referred to a third overlapping portion OL3. The third overlapping portion OL3 is disposed between the second data line 171R2 and the third data line 171G1.

An area where the second color filter 230G overlaps the third color filter 230B in the first boundary area b1 is referred to a fourth overlapping portion OL4. The fourth overlapping portion OL4 overlaps the third data line 171G1.

The third color filter 230B is disposed between the first color filter 230R and the second color filter 230G in the first boundary area b1 so a sum of the areas occupied by the first color filter 230R and the third color filter 230B is greater than the area occupied by the second color filter 230G in the first boundary area b1. That is, the ratio of the green filter is greater than the sum of the ratios of the red filter and the blue filter in the first boundary area b1.

The light passing through the area between the first storage electrode 133 and the second data line 171R2 and the area between the second data line 171R2 and the third storage electrode 137 in the first boundary area b1 is partly blocked by the first color filter 230R. The light passing through the area between the third storage electrode 137 and the third data line 171G1 is partly blocked by the third color filter 230B. The transmittance of the first color filter 230R and the third color filter 230B is less than the transmittance of the second color filter 230G so the contrast ratio may be increased by reducing the leakage of light compared to the case when the first color filter 230R overlaps the second color filter 230G in the center of the first boundary area b1.

An LCD according to an exemplary embodiment of the invention will now be described with reference to FIG. 19.

Figure 19:
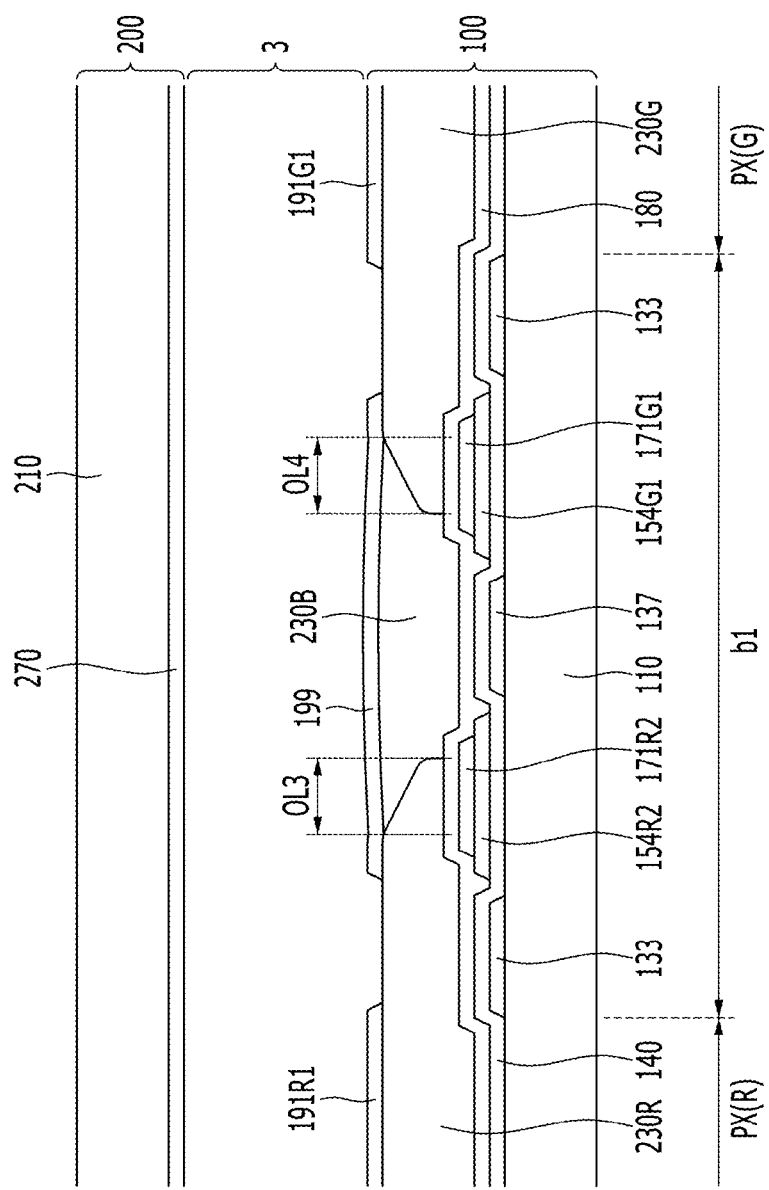
FIG. 19 shows a cross-sectional view of an exemplary embodiment of an LCD according to the invention.

The LCD shown with reference to FIG. 19 mostly corresponds to the LCD shown with reference to FIG. 18, so no repeated descriptions will be provided. A position of the third overlapping portion according to the exemplary embodiment is different from the previous exemplary embodiment, which will now be described.

FIG. 19 shows a cross-sectional view of an LCD according to an exemplary embodiment of the invention. FIG. 19 shows peripheral areas with respect to the first boundary area.

The third overlapping portion OL3 where the first color filter 230R overlaps the third color filter 230B in the first boundary area b1 overlaps the second data line 171G.

The fourth overlapping portion OL4 where the second color filter 230G overlaps the third color filter 230B in the first boundary area b1 overlaps the third data line 171G1.

Therefore, the area occupied by the third color filter 230B is further increased compared to the previous exemplary embodiment. The sum of the areas occupied by the first color filter 230R and the third color filter 230B is greater than the area occupied by the second color filter 230G in the first boundary area b1.

The light passing through the area between the first storage electrode 133 and the second data line 171S2 in the first boundary area b1 is partly blocked by the first color filter 230R. The light passing through the area between the second data line 171R2 and the third storage electrode 137 and the area between the third storage electrode 137 and the third data line 171G1 is partly blocked by the third color filter 230B. The transmittance of the first color filter 230R and the third color filter 230B is less than the transmittance of the second color filter 230G so the contrast ratio may be increased by reducing the leakage of light compared to the case when the first color filter 230R overlaps the second color filter 230G in the center of the first boundary area b1.

A characteristic for a green filter to show greater transmittance than a red filter and a blue filter will now be described with reference to FIGS. 20 and 21.

Figure 20:
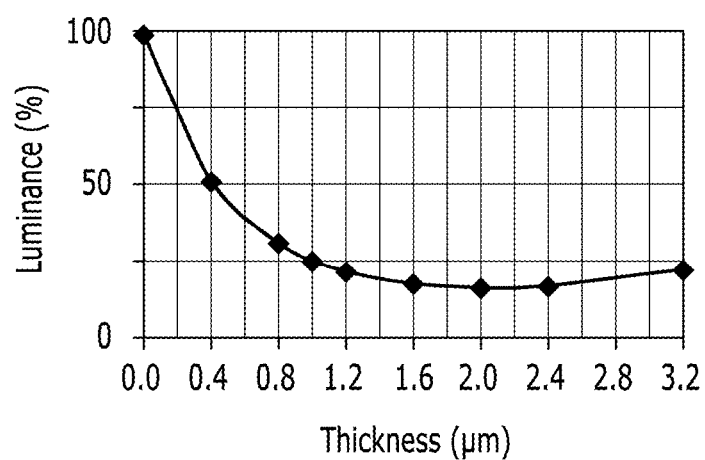
FIG. 20 shows a graph for indicating luminance according to a thickness of a red filter when the red filter overlaps a green filter.
Figure 21:
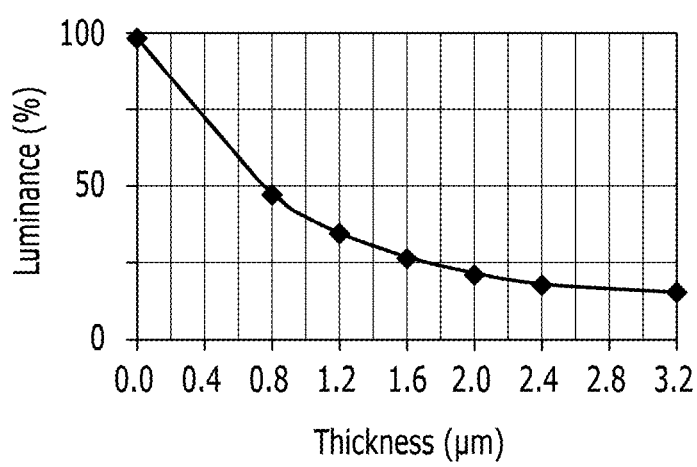
FIG. 21 shows a graph for indicating luminance according to a thickness of a blue filter when a green filter overlaps the blue filter.

FIG. 20 shows a graph for indicating luminance according to a thickness of a red filter when the red filter overlaps a green filter, and FIG. 21 shows a graph for indicating luminance according to a thickness of a blue filter when a green filter overlaps the blue filter. An entire thickness of the portion where the red filter overlaps the green filter is about 3.2 micrometers (μm) in FIG. 20, and the green filter becomes thinner as the red filter indicating the horizontal axis becomes thicker. An entire thickness of the portion where the green filter overlaps the blue filter is about 3.2 μm in FIG. 21, and the green filter becomes thinner as the blue filter indicating the horizontal axis becomes thicker. The vertical axis represents luminance. Particularly, when luminance of the green filter is 100%, relative luminance on the portion where the green filter overlaps another filter is shown.

As shown in FIG. 20, the luminance of the area where the red filter overlaps the green filter is reduced as the red filter becomes thicker. That is, the transmittance tends to be reduced as the ratio of the red filter is increased in the area where the red filter overlaps the green filter. It is accordingly found that the transmittance of the green filter is greater than the transmittance of the red filter.

The case in which the red filter overlaps the green filter shows less transmittance than the case in which the red filter is provided. In an exemplary embodiment, the minimum luminance is shown when the red filter is about 2.0 μm thick and the green filter is about 1.2 μm thick.

As shown in FIG. 21, the luminance of the area where the green filter overlaps the blue filter is reduced as the blue filter becomes thicker. That is, the transmittance tends to be reduced as the ratio of the blue filter is increased in the area where the green filter overlaps the blue filter. It is accordingly found that the transmittance of the green filter is greater than the transmittance of the blue filter.

The case in which the blue filter is provided shows transmittance that is less than the case in which the green filter overlaps the blue filter. In an exemplary embodiment, the minimum luminance is shown when the blue filter is about 3.2 μm thick.

As described, the green filter has greater transmittance than the red filter and the blue filter, and the LCD according to an exemplary embodiment of the invention prevents the leakage of light by increasing the ratio of another color filter in the area where the green filter overlaps the color filter.

A characteristic of preventing leakage of light in a first boundary area and a second boundary area by an LCD according to an exemplary embodiment of the invention will now be described with reference to FIGS. 22 and 23. For comparison, an LCD according to a reference embodiment will also be described.

Figure 22:
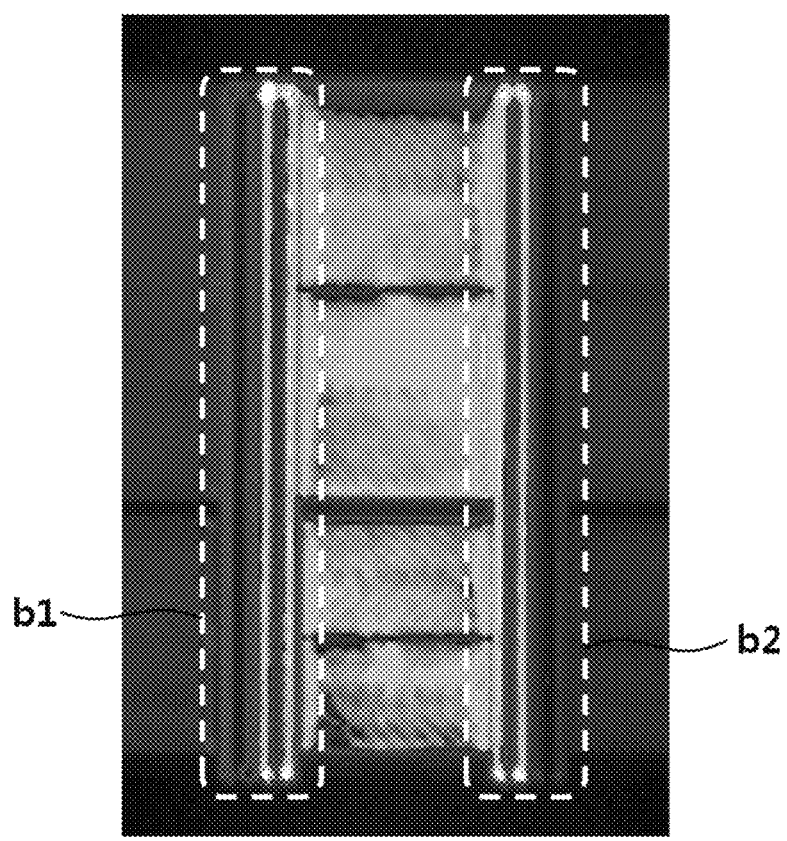
FIG. 22 shows a photograph for indicating light transmitting through an LCD according to a reference embodiment.
Figure 23:
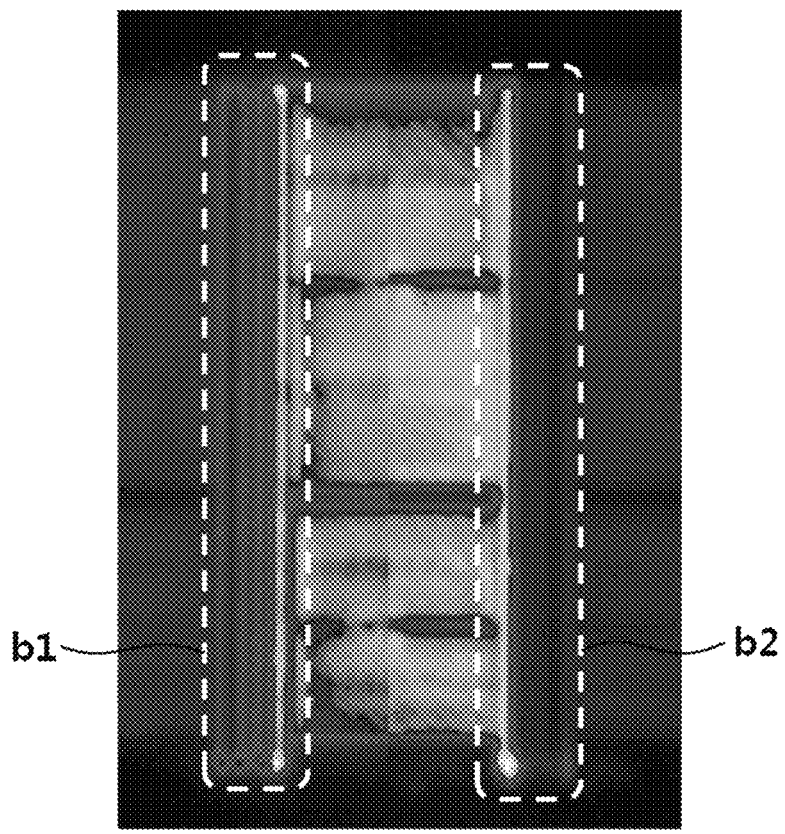
FIG. 23 shows a photograph for indicating an exemplary embodiment of light transmitting through an LCD according to the invention.

FIG. 22 shows a photograph for indicating the light transmitting through an LCD according to a reference embodiment, and FIG. 23 shows a photograph for indicating light transmitting through an LCD according to an exemplary embodiment of the invention. FIGS. 22 and 23 show part of two neighboring pixel areas with respect to a green pixel area.

Referring to FIG. 22, it is confirmed that luminance of the green pixel area provided in the center is greater than that of another pixel area. It is found that the light is leaked in a vertical stripe pattern in the first boundary area b1 disposed between the green pixel area and the red pixel area. It is also found that the light is leaked in a vertical stripe pattern in the second boundary area b2 disposed between the green pixel area and the blue pixel area.

Referring to FIG. 23, it is found that the amount of light leaking in the first boundary area b1 disposed between the green pixel area and the red pixel area is reduced compared to the case of FIG. 22. It is also found that the amount of leaked light is reduced in the second boundary area b2 disposed between the green pixel area and the blue pixel area compared to FIG. 22.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display including a first color pixel area, a second color pixel area, a third color pixel area, a first boundary area disposed between the first color pixel area and the second color pixel area, and a second boundary area disposed between the second color pixel area and the third color pixel area, comprising:
    a first substrate and a second substrate facing each other;
    a first color filter disposed in the first color pixel area and the first boundary area on the first substrate;
    a second color filter disposed in the second color pixel area and the first boundary area on the first substrate;
    a third color filter disposed in the third color pixel area and the second boundary area on the first substrate,
    a plurality of data lines disposed on the first substrate and a liquid crystal layer disposed between the first substrate and the second substrate,
    wherein a first overlapping portion where the first color filter overlaps the second color filter in the first boundary area is disposed closer to the second color pixel area than to the first color pixel area, and
    wherein the first overlapping portion where the first color filter overlaps the second color filter overlaps a data line of the plurality of data lines, and the first color filter is a red color filter, and the second color filter is a green color filter, and the third color filter is a blue color filter, and
    a cross-section area occupied by the first color filter is greater than a cross-section area occupied by the second color filter in the first boundary area, and
    a cross-section area occupied by the third color filter is greater than a cross-section area occupied by the second color filter in the second boundary area.

2. The liquid crystal display of claim 1, wherein
the first substrate and the second substrate include a bendable material.

3. The liquid crystal display of claim 1, further comprising:
    a first color pixel electrode disposed in the first color pixel area on the first substrate; and
    a second color pixel electrode disposed in the second color pixel area on the first substrate,
    wherein the plurality of data lines comprises:
    a first data line and a second data line connected to the first color pixel electrode; and
    a third data line and a fourth data line connected to the second color pixel electrode,
    wherein the second data line is disposed closer to the first color pixel area than to the second color pixel area in the first boundary area, and
    the third data line is disposed closer to the second color pixel area than to the first color pixel area in the first boundary area.

4. The liquid crystal display of claim 3, wherein
    a first-side edge of the first overlapping portion is disposed between the second data line and the third data line, and
    a second-side edge of the first overlapping portion overlaps the third data line.

5. The liquid crystal display of claim 3, wherein
    a first-side edge and a second-side edge of the first overlapping portion overlap the third data line.

6. The liquid crystal display of claim 3, wherein
    a first-side edge of the first overlapping portion overlaps the second data line, and
    a second-side edge of the first overlapping portion overlaps the third data line.

7. The liquid crystal display of claim 3, further comprising:
    a storage electrode disposed between the second data line and the third data line.

8. The liquid crystal display of claim 7, wherein
    a first-side edge of the first overlapping portion overlaps the storage electrode, and
    a second-side edge of the first overlapping portion overlaps the third data line.

9. The liquid crystal display of claim 3, further comprising:
    a gate line connected to the first color pixel electrode, the second color pixel electrode, and a third color pixel electrode; and
    a light blocking member disposed on the second substrate,
    wherein the light blocking member overlaps the gate line and is separated from the first to fourth data lines in a plan view.

10. The liquid crystal display of claim 3, wherein
the first color pixel electrode includes a first sub-pixel electrode and a second sub-pixel electrode, the first data line is connected to the first sub-pixel electrode, and the second data line is connected to the second sub-pixel electrode, while the second color pixel electrode includes a third sub-pixel electrode and a fourth sub-pixel electrode, the third data line is connected to the third sub-pixel electrode, and the fourth data line is connected to the fourth sub-pixel electrode.

11. The liquid crystal display of claim 1,
wherein the second color filter is further disposed in the second boundary area, and
a second overlapping portion where the second color filter overlaps the third color filter in the second boundary area is disposed closer to the second color pixel area than to the third color pixel area.

12. The liquid crystal display of claim 1, further comprising:
a first color pixel electrode disposed in the first color pixel area on the first substrate; and
a second color pixel electrode disposed in the second color pixel area on the first substrate,
wherein the plurality of data lines comprises:
a first data line connected to the first color pixel electrode;
a second data line connected to the second color pixel electrode, and
wherein the second data line is disposed in a center of the first boundary area.

13. The liquid crystal display of claim 12, wherein
a first-side edge of the first overlapping portion overlaps the second data line, and
a second-side edge of the first overlapping portion is disposed between the second data line and the second color pixel area.

14. The liquid crystal display of claim 1, wherein
the second color filter is disposed on the first color filter in the first overlapping portion.

15. A liquid crystal display including a first color pixel area, a second color pixel area, and a first boundary area disposed between the first color pixel area and the second color pixel area, comprising:
a first substrate and a second substrate facing each other;
a first color filter disposed in the first color pixel area and the first boundary area on the first substrate;
a first color pixel electrode disposed in the first color pixel area;
a second color filter disposed in the second color pixel area and the first boundary area on the first substrate;
a second color pixel electrode disposed in the second color pixel area;
a third color filter disposed in the first boundary area on the first substrate;
a plurality of data lines disposed on the first substrate; and
a liquid crystal layer disposed between the first substrate and the second substrate,
wherein at least one of a first overlapping portion where the first color filter overlaps the third color filter and a second overlapping portion where the second color filter overlaps the third color filter overlaps a data line of the plurality of data lines,
wherein the plurality of data lines comprise a first data line and a second data line connected to the first color pixel electrode and a third data line and a fourth data line connected to the second color pixel electrode, and
wherein the liquid crystal display further comprises a storage electrode disposed between the second data line and the third data line, and
the storage electrode extends along an extending direction of the plurality of data lines.

16. The liquid crystal display of claim 15, wherein
the first color filter represents red, the second color filter represents green, and the third color represents blue.

17. The liquid crystal display of claim 16, wherein
the third color filter is disposed between the first color filter and the second color filter in the first boundary area.

18. The liquid crystal display of claim 17,
wherein the second data line is disposed closer to the first color pixel area than to the second color pixel area in the first boundary area, and
the third data line is disposed closer to the second color pixel area than to the first color pixel area in the first boundary area.

19. The liquid crystal display of claim 18, wherein
the first overlapping portion where the first color filter overlaps the third color filter in the first boundary area is disposed between the second data line and the third data line, and
the second overlapping portion where the second color filter overlaps the third color filter in the first boundary area overlaps the third data line.

20. The liquid crystal display of claim 18, wherein
the first overlapping portion where the first color filter overlaps the third color filter in the first boundary area overlaps the second data line, and
the second overlapping portion where the second color filter overlaps the third color filter in the first boundary area overlaps the third data line.

* * * * *